(12) United States Patent
Queval

(10) Patent No.: US 12,453,497 B2
(45) Date of Patent: *Oct. 28, 2025

(54) SAMPLE COLLECTION DEVICE, SYSTEM AND METHOD FOR EXTRACTING AND COLLECTING A SAMPLE OF A FLUID OF A USER

(71) Applicant: LOOP MEDICAL SA, Lutry (CH)

(72) Inventor: Arthur Queval, Lutry (CH)

(73) Assignee: LOOP MEDICAL SA, Lutry (CH)

( * ) Notice: Subject to any disclaimer, the term of this patent is extended or adjusted under 35 U.S.C. 154(b) by 0 days.

This patent is subject to a terminal disclaimer.

(21) Appl. No.: 18/148,346

(22) Filed: Dec. 29, 2022

(65) Prior Publication Data
US 2023/0146889 A1 May 11, 2023

Related U.S. Application Data

(63) Continuation of application No. 17/096,796, filed on Nov. 12, 2020.

(30) Foreign Application Priority Data

Nov. 13, 2019 (EP) .................................... 19208831

(51) Int. Cl.
*A61B 5/15* (2006.01)

(52) U.S. Cl.
CPC .. *A61B 5/150343* (2013.01); *A61B 5/150022* (2013.01); *A61B 5/150236* (2013.01); *A61B 5/150458* (2013.01); *A61B 5/150465* (2013.01)

(58) Field of Classification Search
CPC .............. A61B 5/154; A61B 5/150442; A61B 5/150458; A61B 5/150465; A61B 5/15016; A61B 5/150969; A61B 5/15113
See application file for complete search history.

(56) References Cited

U.S. PATENT DOCUMENTS 5,636,640 A    6/1997   Staehlin
5,951,582 A * 9/1999   Thorne .............. A61B 5/15128
                                               606/167

(Continued)

FOREIGN PATENT DOCUMENTS

CN           104146716 A    11/2014
CN           106470593 A     3/2017

(Continued)

OTHER PUBLICATIONS

European Patent Office, Extended European Search Report Issued in Application No. 22208588.8, Jul. 31, 2023, Germany, 9 pages.

(Continued)

*Primary Examiner* — Jennifer Robertson
*Assistant Examiner* — Huong Nguyen
(74) *Attorney, Agent, or Firm* — McCoy Russell LLP

(57) ABSTRACT

A sample collection device for collecting a blood sample of a patient, the sample collection device including a first partially deformable shell and a second at least partially pierceable shell with a pre-packaged vacuum sealed between the first shell and the second shell. The second shell may additionally hold a sample container and an automatic mechanical cutting mechanism including a rotatable cutting blade and an actuator spring, the actuator spring being actuatable by pressing the first shell, thereby releasing and rotating the cutting blade. By pressing the first shell, the pre-packaged vacuum is released to a collection opening of the second shell such that the vacuum effects a suction effect so that blood coming out of the incision created by the rotatable cutting blade leaks into the sample container.

20 Claims, 44 Drawing Sheets

(56) References Cited

U.S. PATENT DOCUMENTS

| | | | |
|---|---|---|---|
| 6,283,926 | B1 | 9/2001 | Cunningham et al. |
| 6,332,871 | B1 | 12/2001 | Douglas et al. |
| 9,033,898 | B2* | 5/2015 | Chickering, III .. A61B 5/15119 |
| | | | 600/583 |
| 2004/0127818 | A1* | 7/2004 | Roe ................... A61B 5/150442 |
| | | | 600/583 |
| 2009/0192409 | A1* | 7/2009 | Wong ................. A61B 5/15113 |
| | | | 600/583 |
| 2012/0123297 | A1* | 5/2012 | Brancazio ........ A61B 5/150732 |
| | | | 600/576 |
| 2012/0277696 | A1 | 11/2012 | Gonzalez-Zugasti et al. |
| 2014/0073992 | A1* | 3/2014 | Hufford ........... A61B 5/150427 |
| | | | 600/583 |
| 2014/0309096 | A1 | 10/2014 | Wilkinson et al. |
| 2017/0122846 | A1* | 5/2017 | Holmes ................ G01N 33/491 |
| 2019/0000365 | A1* | 1/2019 | Beyerlein ............. B01L 3/0296 |

FOREIGN PATENT DOCUMENTS

| | | |
|---|---|---|
| CN | 107847193 A | 3/2018 |
| CN | 208339519 U | 1/2019 |
| WO | 2013104678 A1 | 7/2013 |
| WO | 2017024117 A1 | 2/2017 |
| WO | 2020167746 A1 | 8/2020 |

OTHER PUBLICATIONS

China National Intellectual Property Administration, Office Action and Search Report Issued in Application No. 202011263828.8, Oct. 31, 2024, 12 pages. (Submitted with Partial English Translation).

\* cited by examiner

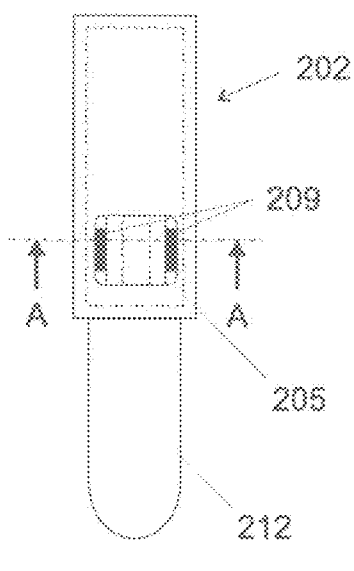
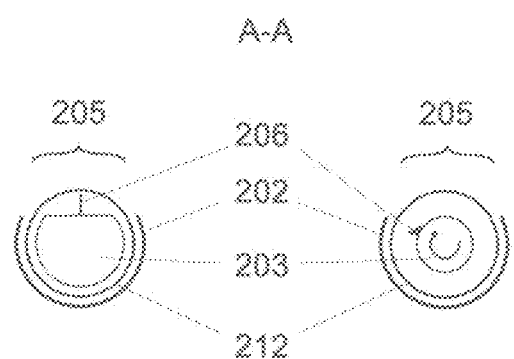
Fig. 27A
Fig. 27B
Fig. 27C

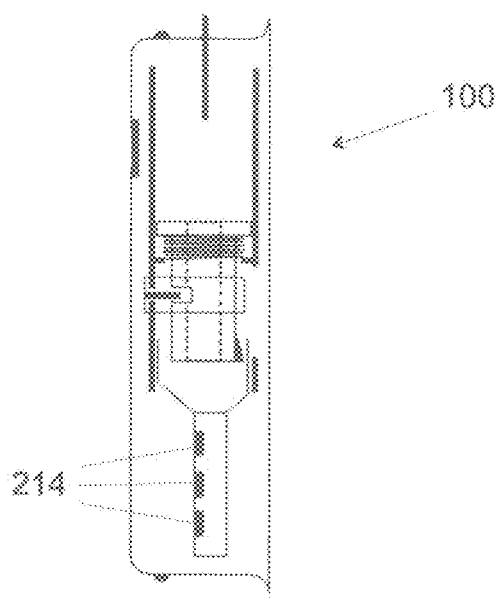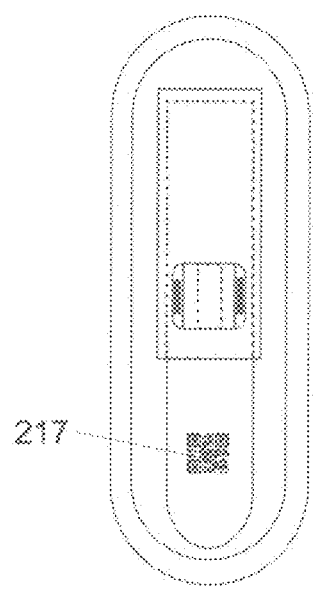
Fig. 28                    Fig. 29

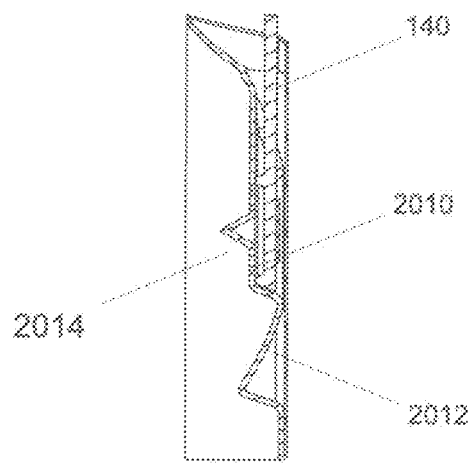
Fig. 38
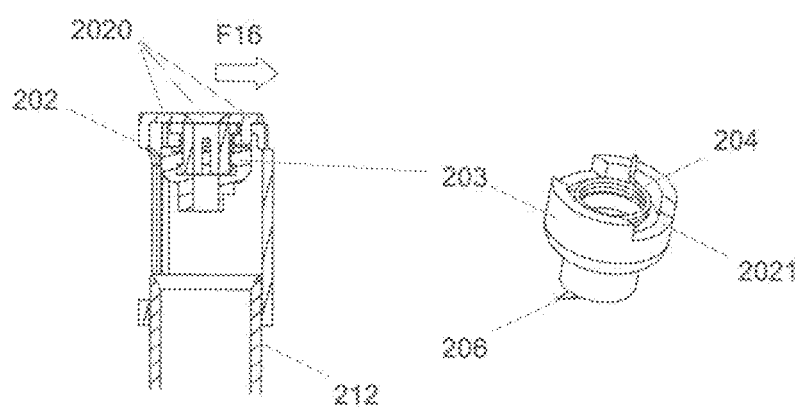
Fig. 39
Fig. 40

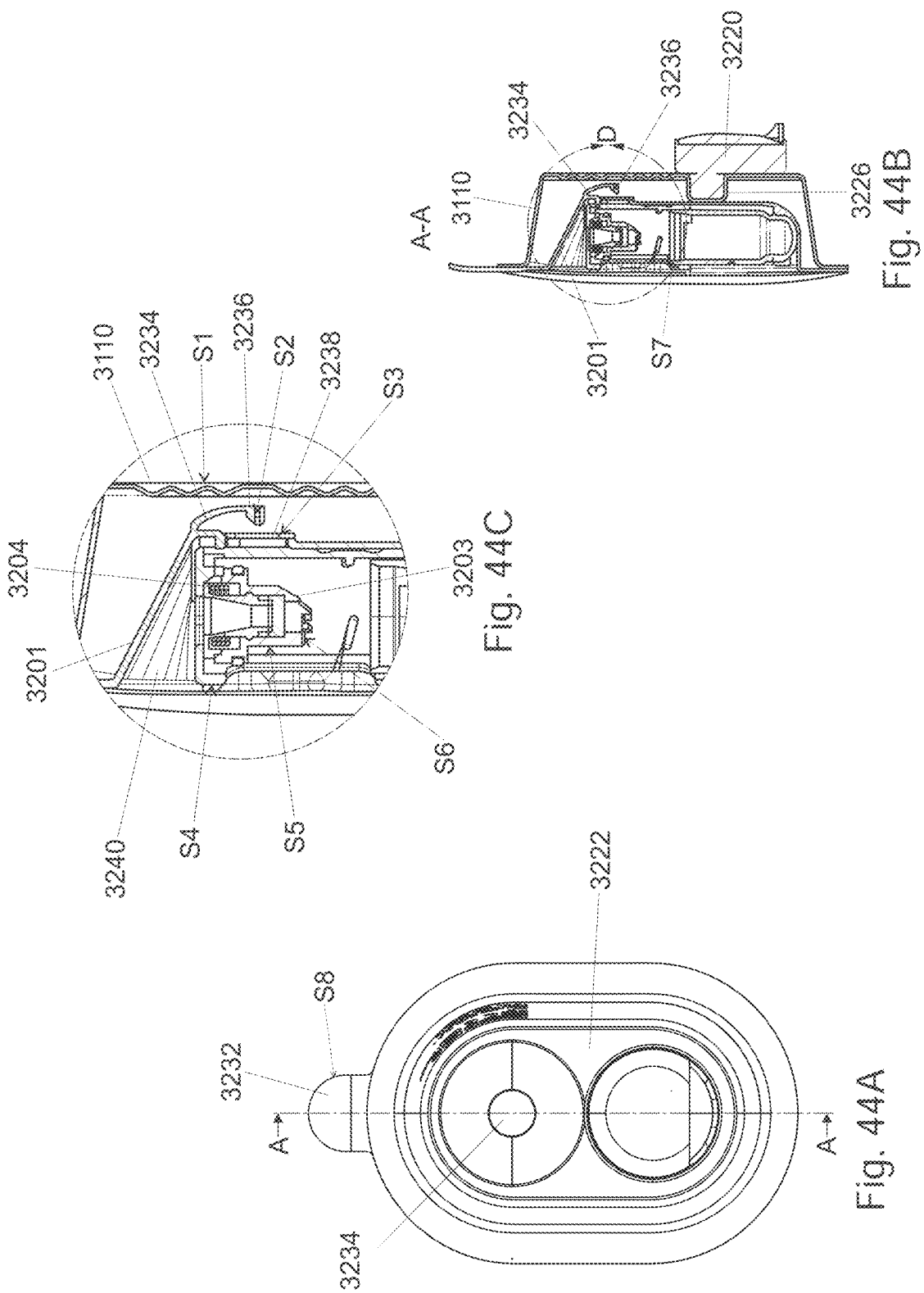

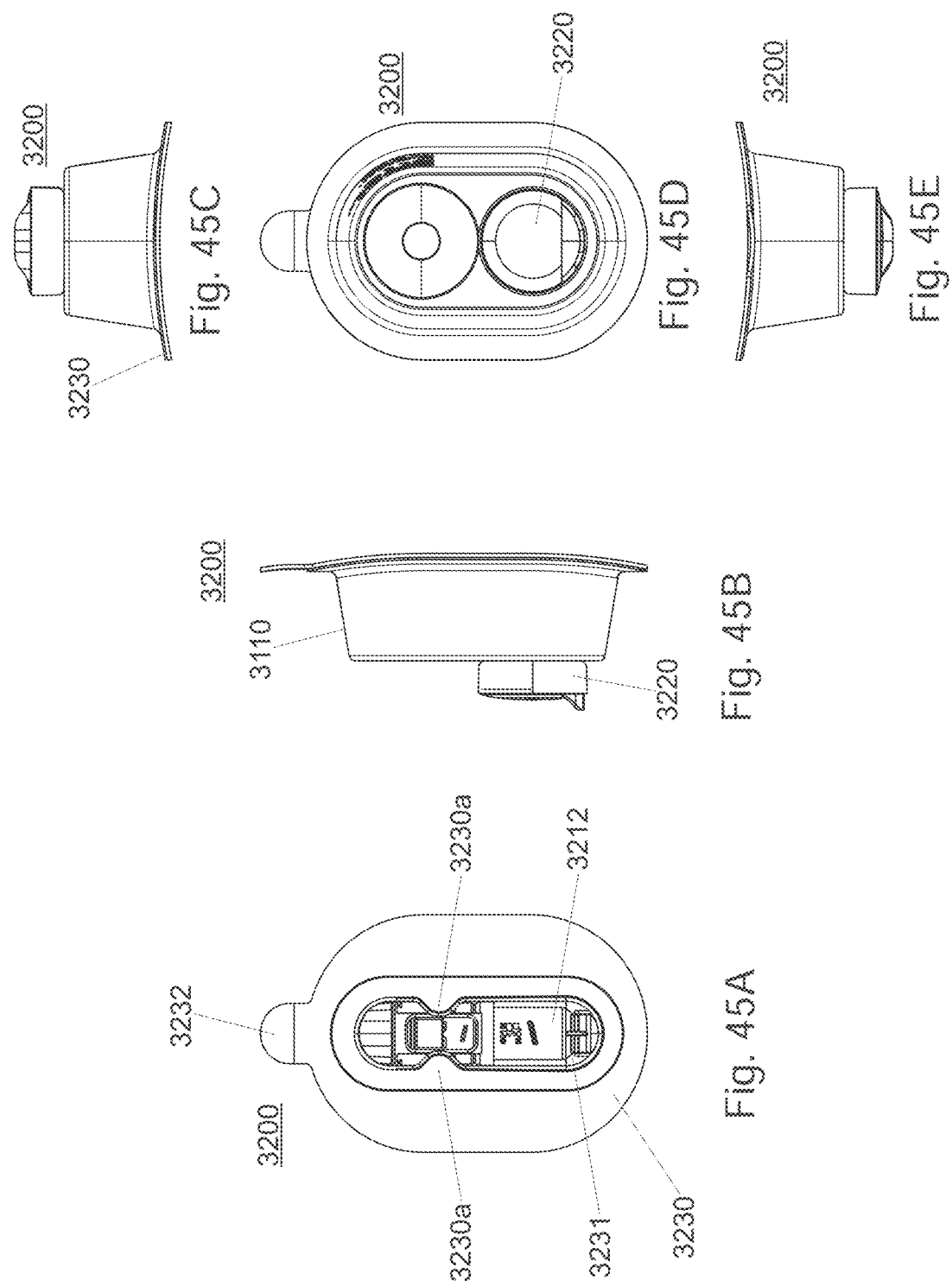

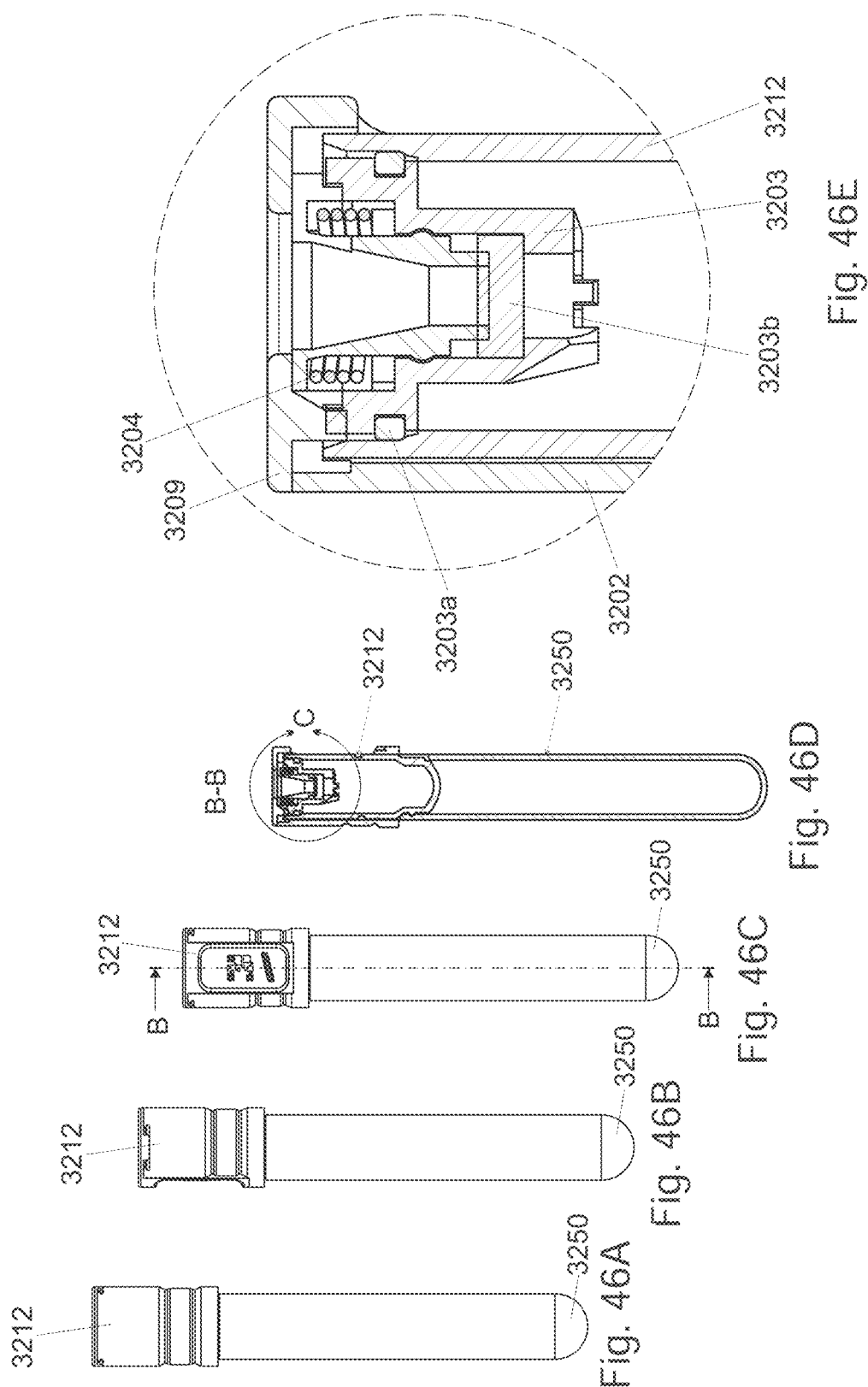

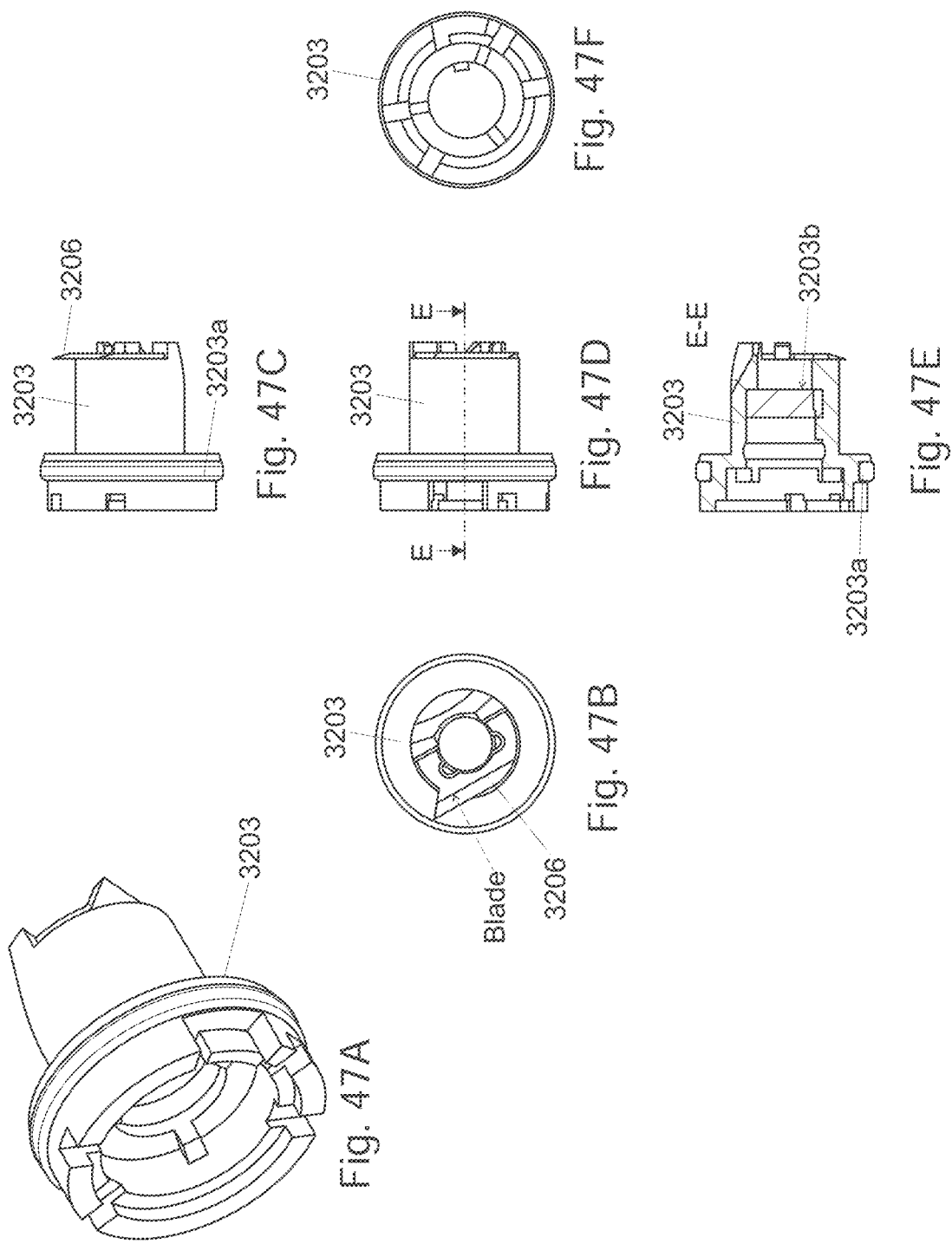

SAMPLE COLLECTION DEVICE, SYSTEM AND METHOD FOR EXTRACTING AND COLLECTING A SAMPLE OF A FLUID OF A USER

CROSS-REFERENCE TO RELATED APPLICATIONS

The present application is a continuation of U.S. Non-Provisional Patent Application Ser. No. 17/096,796, entitled "SAMPLE COLLECTION DEVICE, SYSTEM AND METHOD FOR EXTRACTING AND COLLECTING A SAMPLE OF A FLUID OF A USER," and filed on Nov. 12, 2020. U.S. Non-Provisional patent application Ser. No. 17/096,796 claims priority to European Patent Application No. 19208831.8 filed on Nov. 13, 2019. The entire contents of each of the above-listed applications are hereby incorporated by reference for all purposes.

TECHNICAL FIELD

Embodiments of the subject matter disclosed herein relate to a sample collection device for collecting a sample of a fluid of a user, e.g. blood, in particular capillary blood. Specifically, a system and a method for extracting and collecting this sample.

BACKGROUND AND SUMMARY

Venipuncture is a blood collection method where the vein is punctured by a hollow needle and blood is collected into a tube. This method allows collection of large and high quality blood samples into tubes. Several tubes can be filled during one blood sampling. Furthermore, these tubes are compatible with highly automated blood analyzers, which can analyze thousands of samples per day. These high throughputs capabilities answer the growing need for fast and clinical grade diagnostics at the lowest cost.

However, this method requires a healthcare professional (e.g. a nurse) with a specific qualification and a dedicated infrastructure. Moreover, risks are associated with puncturing the vein: if the vein is fragile or if the gesture is not performed properly, it can result in a hematoma. There is also a risk of a needle-stick injury, which may expose the healthcare professionals to blood-borne diseases.

On the other hand, the finger prick method consists of an incision in the skin at the fingertip using a lancet. A drop or a few drops of capillary blood can be collected into capillary tubes or into dedicated analytical devices (e.g. microfluidic devices, lab-on-chip, paper-based diagnostic tools, and the like). While this technique does not require highly trained professional and can be performed by the patient himself, it is very difficult to collect more than 100 µl of blood and to perform many analyses per sample.

Moreover, the blood collected into glass capillaries or through other devices, cannot be analyzed by the automated analyzers used by central laboratories, which require a minimum dead volume of blood of 100 µl to 200 µl in a single tube.

In some instances, more blood, up to 0.5 ml, can be collected with the finger prick method. However, this requires pressing and squeezing the finger in order to collect more blood. Squeezing too hard may result in haemolysis (damage of the red blood cells) and dilution of the blood sample by the interstitial fluid contained in spaces between the tissue cells. For these reasons, and to keep a good blood quality, the use of finger prick is generally limited to the collection of small volumes of blood.

U.S. Pat. No. 6,283,926 describes a method and a device for obtaining samples of blood for diagnostic purposes. The device comprises a vacuum pump, which requires a source of power, and a micro-controller arranged to drive the pump and the lancet based on the signal from a pressure sensor. The lancet of this device moves in a direction perpendicular to the skin of the user. This device is complicated, as it comprises several electronics components. Moreover, it is arranged to draw relatively small blood volumes (1 µl).

An aim of the present disclosure is to propose a sample collection device that simplifies the collection of a fluid of a user, e.g. blood, while keeping a high-quality standard for its analysis.

Another aim of the present disclosure is to propose a sample collection device which is safer for the user or for an operator (e.g. a nurse), as it minimizes the risk of injury by handling it.

Another aim of the present disclosure is to propose a sample collection device that reduces the risk of contamination of the collected sample.

Another aim of the present disclosure is to propose a sample collection device that is compatible with standard blood analyzers of central laboratories.

Another aim of the present disclosure is to propose a system for extracting and collecting a user fluid sample which can be used without the need of high-skill training, for example which can be used by the user himself (i.e. a patient).

Another aim of the present disclosure is to propose a system for extracting and collecting a user fluid sample that requires minimal action from the user.

Another aim of the present disclosure is to propose a system for extracting and collecting a user fluid sample that can collect about 0.5 ml to 2 ml of fluid, e.g. 1 ml of fluid.

Another aim of the present disclosure is to propose a system for extracting and collecting a user fluid sample that is as painless as possible.

Another aim of the present disclosure is to propose a system for extracting and collecting a user fluid sample that avoids and/or prevents cross contamination of the fluid sample.

According to the disclosure, these aims are achieved by means of the sample collection device, the system and the method for extracting and collecting a sample of a fluid of a user according to the attached independent claims.

In particular, according to the disclosure, a sample collection device for collecting a blood sample of a patient is provided, the sample collection device at least comprising:
a first partially deformable shell,
a second at least partially pierceable shell, wherein in the mounted state of the collection device a pre-packaged vacuum is sealed between the first shell and the second shell.

In some aspects, the second shell holds, in the mounted state, a sample container and an automatic mechanical cutting mechanism comprising a rotatable cutting blade and an actuator spring, the actuator spring being directly and/or indirectly actuatable by pressing the first shell, thereby releasing and rotating the cutting blade. In some aspects, by pressing the first shell the pre-packaged vacuum is released to a collection opening of the second shell such that the vacuum effects a suction effect such that blood coming out of the incision created by the rotatable cutting blade leaks into the sample container.

The invention is based on the basic idea that by using a minimal cut into the skin of a patient by using a cutting blade that is automatically actuated, the collection of blood can be performed more or less painlessly for the patient. The pain can be further reduced by effecting a tangential cut. By having the prepackaged vacuum between the first and the second shell, wherein these two shells form in the mounted state a vacuum housing, a sufficient suction force or mechanism is provided, by means of which the blood coming out of the incision created by the rotatable cutting blade is leaked and/or flowing into the sample container. In particular, the vacuum can and/or will create a skin deformation, which generates a concentrated vasodilation. Vasodilation then allows an excessive amount of blood to be extracted from the wound created by the blade.

By using a cutting blade (which is to be understood to also cover blade-like elements) an incision into the skin of the patient can be made. Unlike a needle or a lancet or any sharps tips, the use of a cutting blade provides, according to the experience of the inventors, a more accurate and less painful creation of an opening into the skin of the patient for collecting blood. In particular, the blade allows a soft diving and cutting into the skin with less pressure, thereby not creating too much pain. In some cases, no pain was felt by the patients. This concept is inspired by the experience that cuts created e.g. by a sharp knife or even by a sheet of paper are not felt in the first moment, but nevertheless creating enough of an opening to produce blood in the amount needed for analysis.

Additionally, another effect that makes the cut painless is the fact that the skin is stretched when the device is performing the cut. When the skin is pinched before puncturing, there will be also less pain felt. Here, by first stretching the skin then cutting it, the cut is less painful. The skin is stretched, which triggers the spring and blade that cuts the skin. This mechanism ensures that the skin is first stretched before being cut.

The actuator spring can be released for example directly by pressing e.g. a button. However, it is also possible that the actuator spring can be actuated indirectly. This can happen that by pressing the shell, the pierceable shell is punctured, thereby transferring vacuum into the second shell, which has the effect of sucking and stretching the skin. Then, the stretched skin presses against a movable part of the cap, which then releases the spring.

The second shell can be at least partially pierceable. It can be e.g. realized by having a part of the second shell formed by a membrane, which is pierceable. The membrane can be e.g. made of aluminum or any other suitable material, e.g. a polymer or plastic material.

Alternatively, the whole may be pierceable, e.g. made of a pierceable material.

Furthermore, it is possible that the cutting blade is mounted on and/or part of a rotatable plunger.

The plunger may be a rotatable, more or less cylindrical element configured to hold and/or carry the cutting blade. The plunger and the cutting blade may be connected by form-fit or snap-fit only. Also, the form-fit may be used for correct placement during manufacturing only. Then, a connection can be established by gluing or welding.

In particular, it is possible that the blade has one or two recesses (or other specially formed portions), which fit into respective counterparts of the plunger.

The plunger may further comprise a seal portion, the seal portion being arranged and configured such that after the collection of blood the sample container is and/or may be sealed by the seal portion such that the sample container is closed by the plunger and its seal. By this, the plunger may be used as a closure for the sample container. It may be pressed into the sample container as closure means after the blood collection. In particular, it may be pressed into the opening of the sample container by a finger, e.g. the thumb of the user, thereby closing and sealing the sample container and its opening.

Moreover, the plunger further comprises a septum. The septum may be used to create an opening when the collected blood in the sample container shall be analyzed. The septum can be pierceable. It is possible that a standard syringe needle can be used to pierce the septum and to remove the blood from the sample container. Also, the septum may be used by automatic analyzing machines and their analyte collectors, probes, or sample takers.

In connection with the septum, it is possible that the plunger and also the cap and the trigger allow access to the septum. Such access may be formed as a conical hole for guiding the probe for blood analysis. The diameter of the conical hole at the largest opening should be approx. 4.5 mm so as to comply and allow compatibility with standard probes (of e.g. analyzing machines).

Additionally, in a further possible embodiment, the cutting blade may comprise a cutting edge, wherein the cutting edge has an acute end and a rounded end. The acute end may be used to dive into the skin of the patient, while doing the rotation and incision movement. The rounded end is provided to create more handling safety of the blade and also to facilitate the rotation movement of the blade, further reducing the needed space of the blade.

Furthermore it is possible that the cutting edge of the cutting blade has an angle chosen in the range of 15°-25°, especially approx. 19°-21°, in other aspects approx. 20°. This angle has been found to create a very sharp incision due to its smooth but nevertheless sharp diving and cutting into the skin that is less painful than other incision or skin-opening or skin-piercing methods.

Additionally, the acute end of the cutting blade has an angle chosen in the range of 45°-55°, especially approx. 47°-53°, in other aspects approx. 50°. This angle forms at the acute end a sharp tip, which will create the first contact with the skin and start the incision.

It is also possible that the rounded end of the cutting blade may have the same radius as the outer edge of the cutting blade on the side of the rounded end. This facilitates the rotational movement of the cutting blade. Further, the handling safety is enhanced.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

The invention will be better understood with the aid of the description of an embodiment given by way of example and illustrated by the figures, in which:

FIG. 27A shows a front view of a part of the sample collection device according to one embodiment of the invention;

FIG. 27B shows one embodiment of a section view of the part of the sample collection device of FIG. 27A;

FIG. 27C shows another embodiment of a section view of the part of the sample collection device of FIG. 27A;

FIG. 28 shows another embodiment of a cross-section view of the sample extraction device;

FIG. 29 shows another embodiment of a front view of the sample collection device;

FIG. 38 shows a part of a cross-section view of the embodiment of the system of FIG. 36;

FIG. 39 shows another part of another cross-section view of the embodiment of the system of FIG. 36;

FIG. 40 shows a perspective view of one embodiment the triggering and incision mechanisms of system of FIG. 36;

FIG. 44A-C show details of the embodiment shown in FIG. 43, the details being related to the functionality of the device;

FIG. 45A-E different view of the device of FIG. 43;

FIG. 46A-E different views of the sample container of the embodiment shown in FIG. 43;

FIG. 47A-F different views of the plunger and the cutting blade of the embodiment shown in FIG. 43;

DETAILED DESCRIPTION

Figure 1:
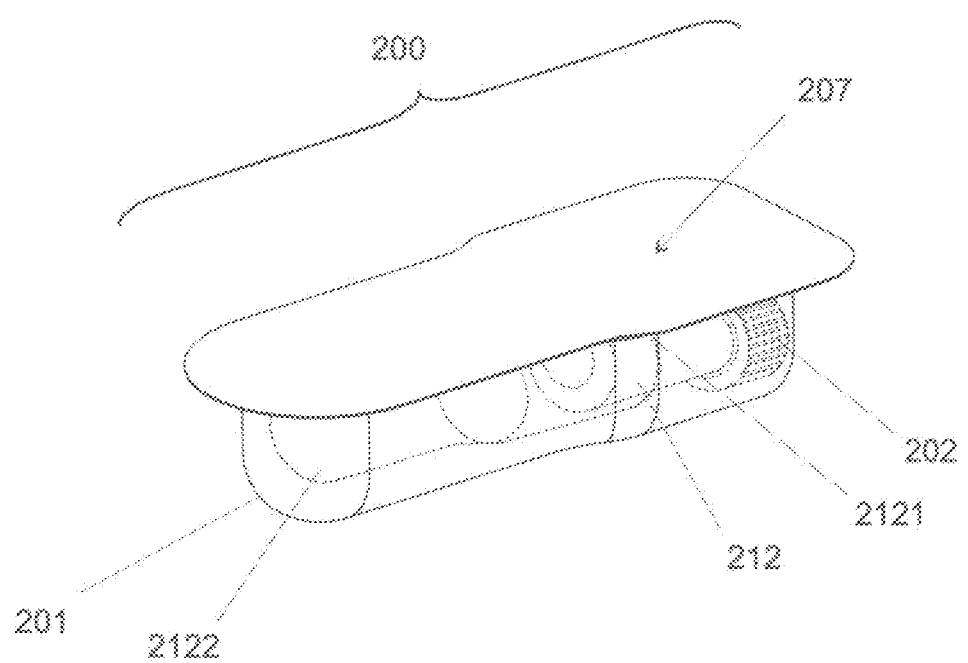
FIG. 1 shows a perspective view of a part of the sample collection device according to one embodiment of the invention.

In the following description provided by way of example, reference will be made, for reasons of simplicity, to a system for collecting and extracting the blood of a user, comprising a blood collection device and a blood extraction device. However, it must be understood that the invention is not limited to such a fluid, but includes also collection devices and extraction devices, both being arranged to collect respectively extract other kinds of fluid, in particular bodily fluids.

In the following description provided by way of example, reference will be made, for reasons of simplicity, to "sample collection device" and "sample extraction device". However, it must be understood that the "sample" indicated in those expressions is a sample of a fluid, in particular a bodily fluid, e.g. blood, in particular capillary blood.

FIGS. 1-49 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

The system 300 for extracting and collecting a sample of a fluid of a user according to the invention comprises two parts:

a sample collection device 200; and a sample extraction device 100.

In one advantageous embodiment, the sample collection device 200 is consumable and the sample extraction device 100 is reusable. In another embodiment, the sample extraction device 100 is also a consumable. In this case, the sample collection device 200 and the sample extraction device 100 can form one single system 300 that is consumable. An example of such consumable system 300 will be discussed with reference to FIG. 36.

We will describe first the features of sample collection device 200, secondly the features of sample extraction device 100 and at the end the method and system of collecting and extracting such a sample.

FIG. 1 shows a perspective view of a part of the sample collection device 200 according to one embodiment of the invention.

The sample collection device 200 according to one embodiment of the invention comprises:

a sample container 212 arranged to receive the sample and comprising an open end 2121;

a cap 202 arranged to cooperate with the sample container 212 so as to close the open end 2121.

In the embodiment of FIG. 1, the sample container 212 is a tube, having substantially a cylindrical shape and comprising the open end 2121 and a closed end 2122 with a substantially spherical shape.

In a particular embodiment, the tube is a "standard" tube, i.e. a tube compatible with standard blood analyzers of central laboratories. For example, the diameter of the standard tube belongs to the range 12 mm-16 mm, e.g. it is equal to 13 mm.

In another embodiment, the length of the tube is less than a standard length, i.e. a length compatible with standard blood analyzers of central laboratories. In such a case, the tube can comprise connection means so as to connect it with an extension tube, so that the total length of the set comprising the tube and the extension tube is a standard length, for example a length ranging from 50 mm to 120 mm, e.g. equal to 75 mm. In another embodiment, this extension tube could also correct the final diameter of the tube. The diameter of the tube could be smaller than the standard diameter, but it could be adjusted with a larger extension tube, so as to be compatible with standard blood analyzers of central laboratories.

In one embodiment, those connection means for connecting the tube with the extension tube are arranged such that they allow an easy connection of the tube with the extension tube, but they prevent or render difficult the disconnection of the extension tube from the tube. This feature is useful in particular if a label identifying the fluid sample is placed on the outer surface of the extension tube, so as to prevent a user from detaching the extension tube from the tube: the traceability of the fluid sample is then guaranteed. In one embodiment, those connection means comprise clip means and/or screwing means.

In a particular embodiment, the tube is arranged for receiving at least 0.5 ml, and preferably 1 ml, of fluid sample, as will be discussed.

In the embodiment of FIG. 1, the sample container 212 may be (at least partially) transparent, so as to directly see its content.

In the embodiment of FIG. 1, the cap 202 is also a "standard" cap i.e. a cap compatible with standard blood analyzers of central laboratories. For example, the diameter of the outer part of the standard cap is 15 mm.

In the embodiment of FIG. 1, the sample container 212 and its cap 202 are placed in a suction pack 201. The size and the shape of the suction pack 201 are therefore arranged to receive the sample container 212 and the cap 202. In one embodiment, the suction pack 201 is made, at least in part, of a flexible material.

The suction pack 201 has two main functions: 1) it is used as a packaging for the sample container 212 and its cap 202; 2) it serves as a suction cup in which vacuum is applied to the user's skin for dsuction and fluid collection, as will be discussed.

In the embodiment of FIG. 1, the suction pack 201 comprises a lid 207, so as to guarantee the sterilization of its content and/or a barrier from moisture. This lid 207 is removable. In one embodiment, it is a semi-permeable membrane that allows the maintenance of the inside of the suction pack 201 as sterilized, for example Tyvek®. In another embodiment, the lid 207 is non-permeable: this allows an airtight environment during storage and/or transport to be maintained so as to prevent humidity from entering the suction pack 201 and/or the sample container 212. In fact, humidity could affect the stability of the additives present in the sample container 212.

In the embodiment of FIG. 1, the suction pack 201 is also (at least partially) transparent, so as to provide a good visual indication of the integrity of its content. Before the use, the user (or an operator, e.g. a nurse) can indeed check that the lid 207 of the suction pack 201 has not been open yet, as an indication that its content is still sterilized and safe to be used.

In one example, the suction pack 201 is made for instance of polycarbonate, PET-G, etc. so that a user or an operator can track the progress of the fluid collection by optically monitoring the level of the fluid sample in the sample container 212.

As will be discussed, in one embodiment the suction pack 201 comprises a semi-permeable membrane allowing the vacuum to enter the suction pack.

In one embodiment, the suction pack 201 comprises or is made (at least partially) of materials enhancing the sealing between the suction pack 201 and the skin of the user, so as to guarantee a good sealing between the skin and the suction pack 201.

In one embodiment, the suction pack 201 is a blister pack.

Consumables or so-called disposables in blister packs are common practice in healthcare.

The advantage of a blister packaging is that it is cost-effective, it can be closed by a removable lid 207, and can be transported and handled while preserving the sterile condition of its content.

Figure 8:
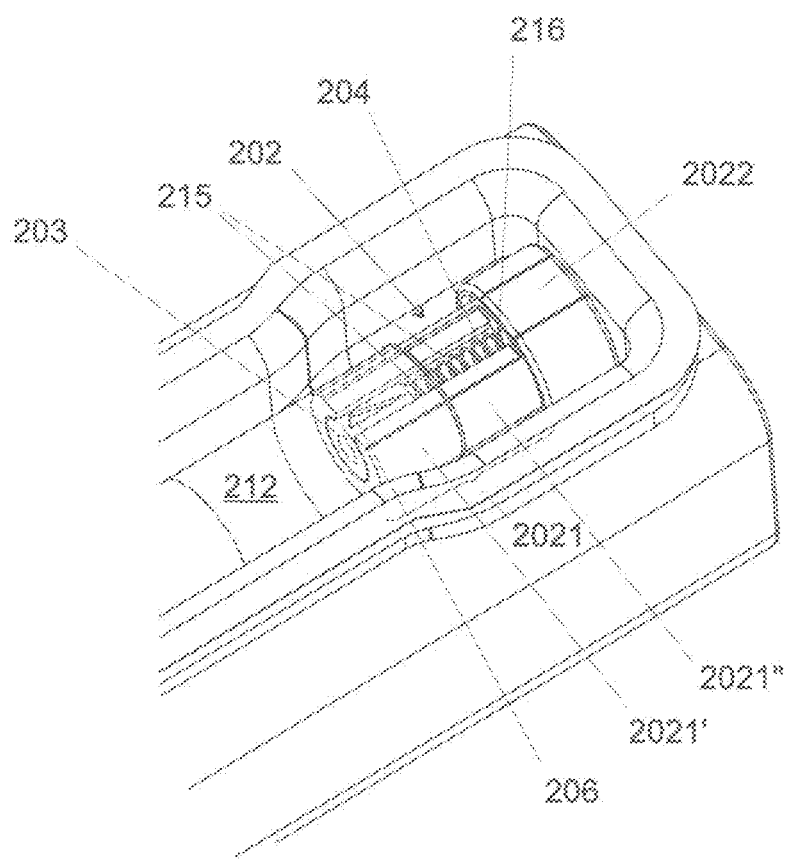
FIG. 8 shows a perspective view of a part of an embodiment of the system according to the invention, wherein the incision mechanism is in the first incision mechanism position.
Figure 9:
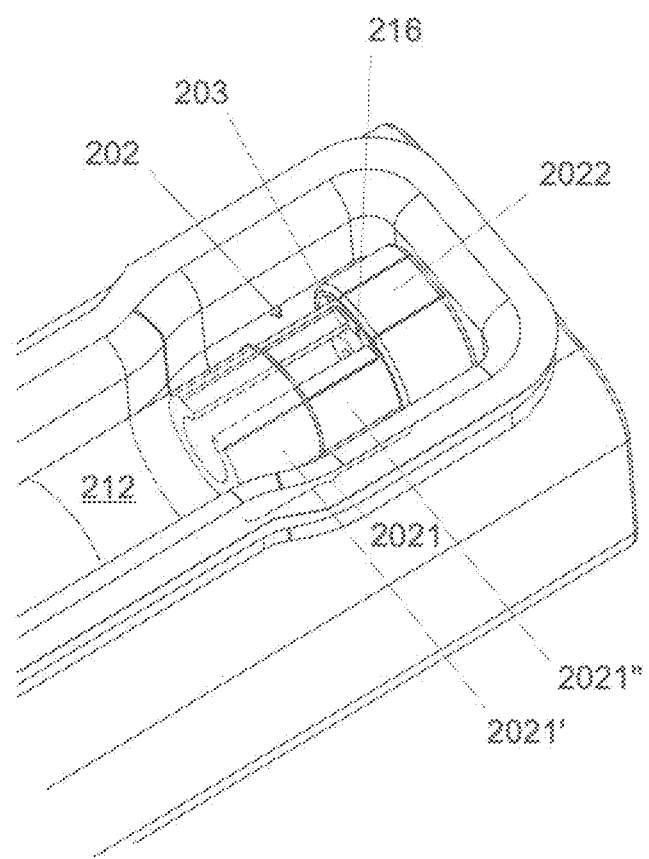
FIG. 9 shows a perspective view of a part of the embodiment of the system of FIG. 8, wherein the incision mechanism is in the second incision mechanism position.
Figures 10A, 10B:
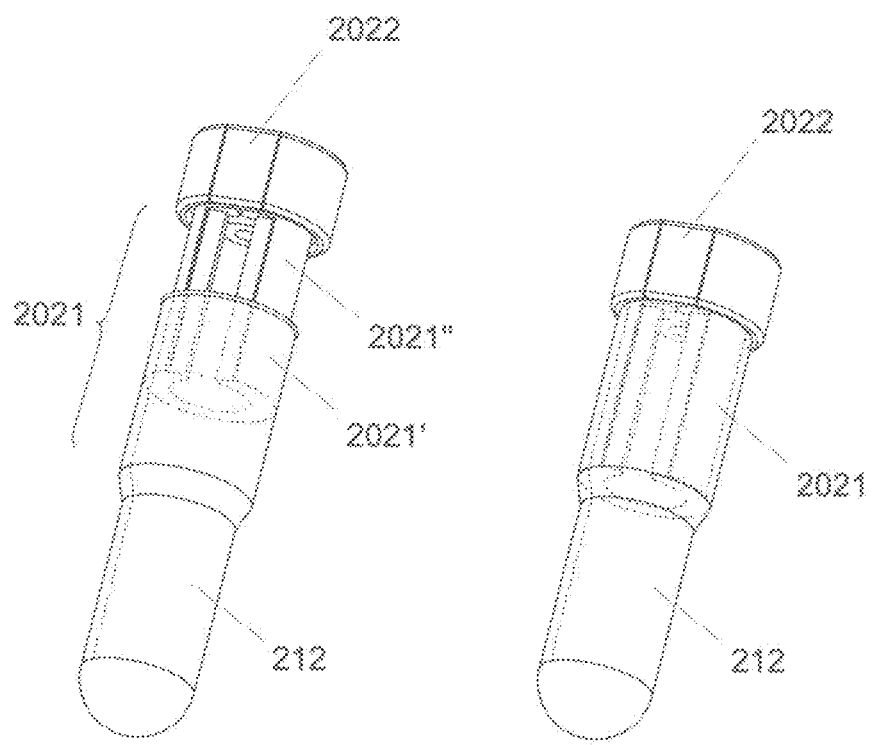
FIG. 10A shows a perspective view of one embodiment of a part of the sample collection device according to one embodiment of the invention, wherein the cap is in the first cap position.
FIG. 10B shows a perspective view of one embodiment of the part of the sample collection device of FIG. 10A, wherein the cap is in the second cap position.
Figures 11A, 11B, 11C:
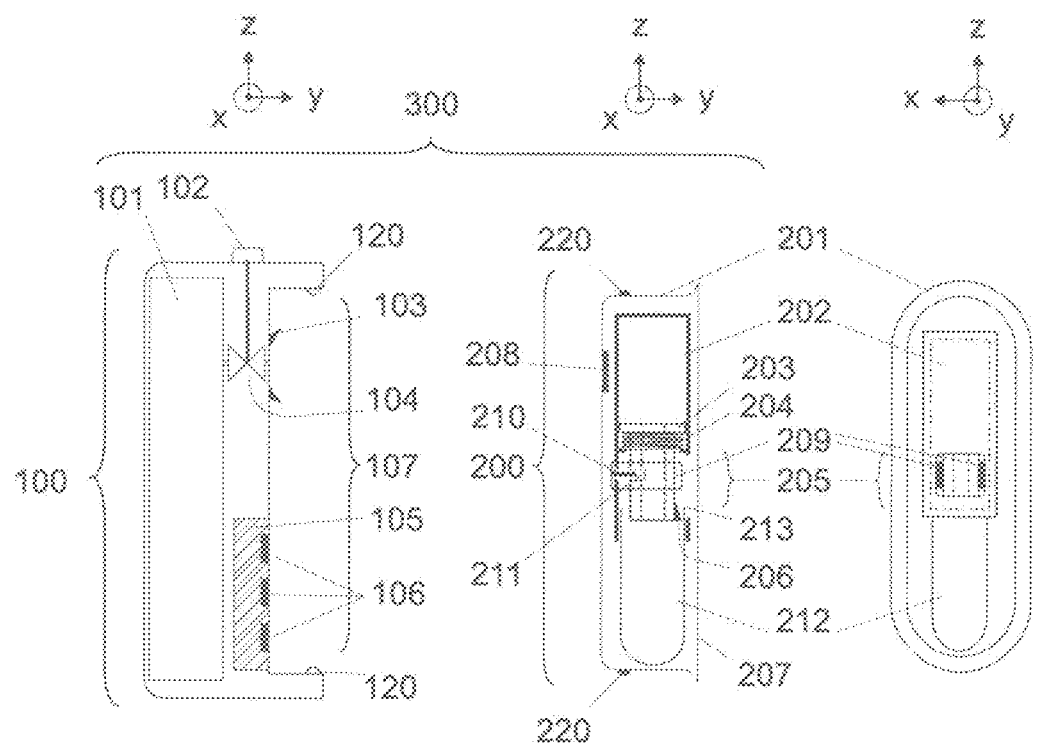
FIG. 11A shows a cross-section view of one embodiment of the sample extraction device of the system for extracting and collecting a sample of a fluid of a user according to the invention.
FIG. 11B shows a cross-section view of one embodiment of the sample collection device according to the invention.
FIG. 11C shows a front view of the embodiment of the sample collection device of FIG. 11B.

According to the invention, the cap 212 comprises:
- a collection window 205, visible e.g. in FIGS. 8, 11B and 11C and arranged to enter in contact with the area or part of the user to be incised;
- a triggering mechanism; and
- an incision mechanism movable in the cap 202 by the triggering mechanism from a first incision mechanism position (illustrated for example in FIG. 8) to a second incision mechanism position (illustrated for example in FIG. 9).

Advantageously, when moving from the first incision mechanism position to the second incision mechanism position, the incision mechanism is arranged to incise the user at the collection window 205 so as to withdraw the sample from the user. During the movement from the first incision mechanism position to the second incision mechanism, the cap 202 is always in a first cap position, illustrated for example in FIGS. 1, 8, 9 and 10A.

In fact, according to the disclosure, the cap 202 itself is arranged to be moved on the sample container 212 from a first cap position (illustrated for example in FIG. 1, 8, 9 or 10A) to a second cap position (illustrated for example in FIG. 10B), wherein, in both the first and in the second cap positions, the open end 2121 of the sample container 212 is at least partially in contact with the sample container 212 so as to guide the movement of the cap 202 from the first cap position to the second cap position. In the illustrated embodiment, which is not limitative, in both the first and in the second cap positions the open end 2121 of the sample container 212 is closed by the cap 202.

According to the disclosure, the cap 202 also includes a sealing mechanism (not illustrated), so as so seal the sample container when the cap is in the second cap position (illustrated for example in FIG. 10B), so as to safely transport the sample.

Since the fluid is collected with a sufficient amount (about 1 ml), conditioned into a sample container 212 with a cap 202, in which both the sample container and the cap match standards (container size, cap format, and/or additives required for the different types of analyses) used for standard blood analyzers, and safely transported, several analyses can be performed from one sample of fluid collected with the device according to the disclosure.

The collection device according to the invention has therefore the following advantages:
- the cap 202 integrates the incision mechanism;
- the same cap seals the sample container 212 after that the fluid sample has been collected, so as to safely transport this fluid sample;
- the fluid, e.g. blood, is directly collected into the sample container 212 used for its transport and analysis, as the fluid falls down directly into the sample container 212.

It must be noted that the movement of the incision mechanism requires no active actions from the user: in fact, it is triggered by a triggering mechanism in an automatic way, as will be described.

In a particular embodiment, the movement of the cap 202 is manually performed by the user or by an operator. However, in another embodiment, it is automatically performed as well.

In one preferred embodiment, visible for example in FIGS. 8 and 9, the cap 202 includes a first cap portion 2021 and a second cap portion 2022. The two portions 2021, 2022 can be two distinct parts connected together by connecting means (not illustrated). In another embodiment, the cap 202 is a monobloc, i.e. it is made by a single piece comprising those two portions 2021, 2022.

In one embodiment, the first cap portion 2021 comprises the collection window 205.

As visible in FIGS. 8 and 9, the first cap portion 2021 comprises an opening 215 along the main direction of the first cap portion 2021. In other words, since this opening 215 is present, the first cap portion 2021 has a cross section with a substantially C shape.

In the illustrated embodiment, at least a part 2021' of this first cap portion 2021 is inserted during the working of the system 300 into the sample container 212, so as to close the open end 2121 of the sample container 212 during the moving of the incision mechanism.

Another part 2021" of this first cap portion 2021 is outside of the sample container 212, when the cap 202 is in its first position, as illustrated in FIG. 8.

In one embodiment, the second cup portion 2022 is larger than the first cup portion 2021. It is not adapted to enter into the sample container 212, but rather to seal it.

In one embodiment, the second cup portion 2022 comprises the above-mentioned sealing mechanism.

In one embodiment, the second cup portion 2022 comprises a cavity 216, visible in FIGS. 8 and 9, for receiving the incision mechanism, and in particular the cutting element 206, once the incision mechanism is in the second incision mechanism position (illustrated in FIG. 9), so that the incision mechanism is irreversibly and safely retracted in this cavity 216 so that it can no longer incise the user.

In one embodiment, at least a part of the cap 202 is accessible by the user or by an operator, so as to manually extract the fluid sample from the sample container 212, without detaching the cap 202 from the sample container 212.

In one embodiment, the incision mechanism comprises:
a support element 203; and
an elastic element 204.

In one preferred embodiment, the support element 203 is a piston, which is for example visible in FIGS. 8 and 11B. This support element is connected, preferably directly connected, to a cutting element 206, so that once the support element 203 is moved, the cutting element 206 is moved as well.

The cutting element 206 may be a blade, or any other blade-like element capable of forming an opening in the skin of a user.

In one preferred embodiment, the elastic element 204 is a spring, which is for example visible in FIGS. 8 and 11B; this elastic element 204 is blocked before the use of the system according to the invention, for example in a compressed position.

Once the incision mechanism is triggered, the elastic element 204 is free to be decompressed, and this decompression moves the support element 203 and then the cutting element 206 from the first incision mechanism position (visible e.g. in FIG. 8) to the second incision mechanism position (visible e.g. in FIG. 9).

It must be understood that the present invention is not limited to a compression elastic element only, i.e. an elastic element (e.g. a spring) that can be compressed and decompressed, but it also includes other elastic elements, e.g. torsion and/or traction elastic elements, i.e. elastic elements (e.g. springs) that can perform a movement of torsion and/or traction.

As visible in FIG. 8, when the incision mechanism is in the first incision mechanism position, the cutting element 206 is in the sample container 212, so as to ensure the safety of the user and/or of an operator.

In the embodiment of FIGS. 8 and 9, the movement of the incision mechanism from the first incision mechanism position to the second incision mechanism position is a linear movement (i.e. a translation) performed in a direction parallel to a surface of the user to be incised, as illustrated in FIG. 27B.

However, in another alternative embodiment, the movement of the incision mechanism from the first incision mechanism position to the second incision mechanism position is a circular movement (i.e. a rotation), as illustrated in FIG. 27C, wherein the axis of rotation of this circular movement is preferably a main axis of the sample container 212.

For example, this circular movement is possible if the elastic element 204 is a torsion elastic element 204. Another example of such circular movement will be discussed with reference to the embodiment of FIG. 36.

The triggering mechanism of the sample collection device includes a triggering element, which is visible in for example FIGS. 11B and 11C.

This triggering mechanism includes a triggering element 209, which in the illustrated embodiment is a half-ring surrounding at least a part of the support element 203.

In particular, the triggering element 209 includes a protrusion 210, e.g. a finger, which is arranged to be received by a corresponding cavity 211 in the support element 203, so as to hold the triggering element 209 in the first triggering element position visible in for example FIG. 11B.

In the illustrated embodiment, the cap 202 includes the triggering mechanism, in particular the triggering element 209. In another alternative embodiment, not illustrated, the support element 203 includes the triggering mechanism, in particular the triggering element 209.

As will be discussed, once the system 300 is placed on the user's skin, it deforms and/or stretches a part of the user's skin so that this deformed and/or stretched part will move the triggering element 209 from a first triggering element position (visible e.g. in FIG. 17), wherein it holds the elastic element 204 in a compressed position and the support element 203 in a fixed position in the sample container 212, to a second triggering element position (visible e.g. in FIG. 18), wherein the triggering element 209 no longer holds the elastic element 204 nor the support element 203.

Figure 5:
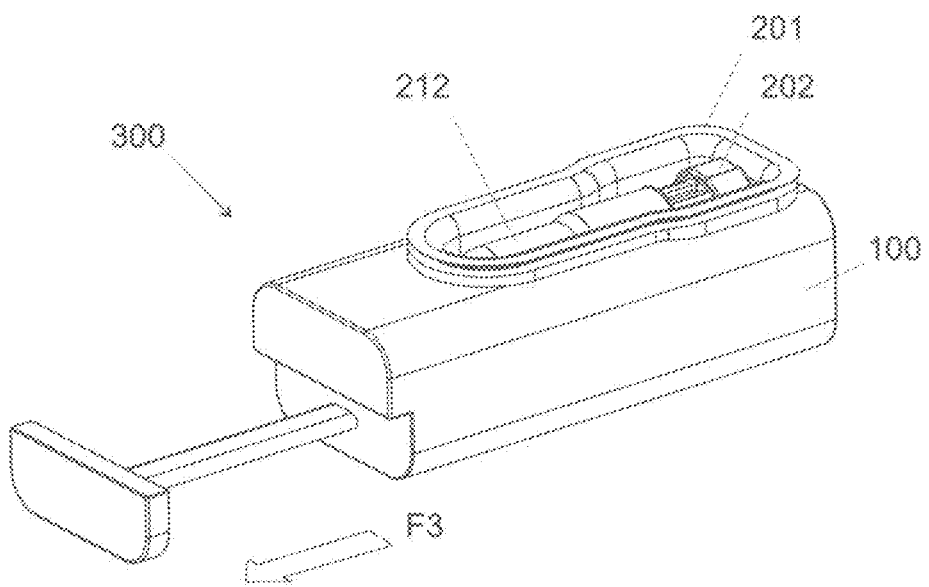
FIG. 5 shows a perspective view of the system of FIG. 4, wherein its vacuum creation mechanism is in a first position.
Figure 6:
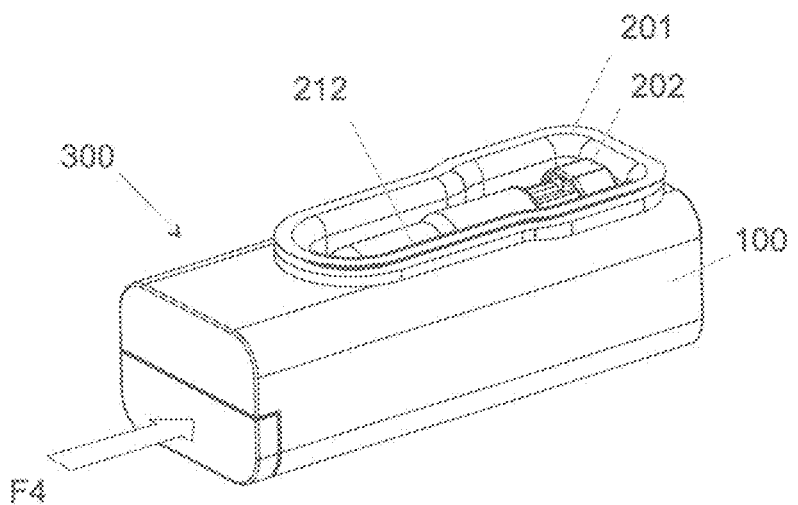
FIG. 6 shows a perspective view of the system of FIG. 4, wherein its vacuum creation mechanism is in a second position.

We describe now the sample extraction device. As is visible for example in FIG. 11A, it comprises:
a port 107 (e.g. a cavity or a recess) arranged to receive at least a part of the sample collection device 200;
a vacuum chamber 101;
a vacuum creation mechanism 108 arranged to create vacuum in the vacuum chamber 101; a non-limitative example of such vacuum creation mechanism is illustrated in FIGS. 5 and 6; the vacuum creation mechanism is preferably completely mechanical and devoid of electronics component;
a valve (or an assembly of valves) 104 arranged to close and/or open the vacuum chamber 101 and/or to release the sample collection device (200) to atmospheric pressure; and
a valve control mechanism 102 arranged to command the valve 104 (or the assembly of valves) so as to transfer the vacuum from the vacuum chamber 101 to the sample collection device 200, but also to release the sample collection device 200 to atmospheric pressure, in particular after collection.

In the present context the term "vacuum" indicates an area with a gaseous pressure much less than the atmospheric pressure, e.g. with a gaseous pressure between −70 kPa and −20 kPa compared to the atmospheric pressure, e.g. of about −40 kPa.

In one preferred embodiment, the valve control mechanism 102 is a button, e.g. a push button, or an assembly of buttons. In one preferred embodiment, it is arranged to control three modes of the valve 104, i.e. open, closed, release.

In one preferred embodiment, the sample extraction device comprising an electronic module 105, visible e.g. on FIG. 11A, comprising a communication module (not illustrated) and a power supply (not illustrated).

In another preferred embodiment, visible e.g. on FIG. 11A, the sample extraction device comprises at least a sensor 106, e.g. an optic sensor, for detecting a predetermined sample volume in the sample container.

In another preferred embodiment, the sample extraction device comprises an alerting mechanism (not illustrated), indicating to the user the end of the sample extraction, e.g. by an audio and/or visible signal.

In another preferred embodiment, the sample extraction device comprises a gasket 103, visible e.g. on FIG. 11A, cooperating with the area of the sample collection device 200 comprising a membrane 208.

In one variant, the membrane 208 is semi-permeable. In another variant, the membrane 208 is non-permeable: maintaining an airtight environment during storage and/or transport so as to prevent humidity from entering the suction pack 201 and/or the sample container 212. In fact, humidity could affect the stability of the additives present in the sample container 212.

We describe now the method for collecting and extracting a sample of a fluid of the user, with the system according to the invention.

In one embodiment, the cap 202 is placed in and/or on the sample container 212, so as to close its open end 2121, as illustrated in FIG. 1.

Then, the sample container 212 and the cap 202 are packaged in the suction pack 201, the suction pack 201 is closed by a lid 207 and the closed suction pack 201, comprising the sample container 212 and the cap 202, is sterilized.

In an embodiment, the sample collection device 200 is consumable and the sample extraction device 100 is not consumable, that is, it is reusable. A new sample collection device 200 is then placed on or in the sample extraction device 100, in particular in a port 107 of the sample extraction device 100, visible in FIG. 11A.

The sample collection device 200 is then mechanically connected to the sample extraction device 100, e.g. by using first and second connection means 120 respectively 220, illustrated in FIGS. 11A and 11B.

Those means guarantee a connection by clip or a snap-fit means, but of course any other kind of means guarantying a mechanical connection between the sample collection device 200 and the sample extraction device 100 can be used, e.g. and in a non-limiting way a magnet on a device and a ferromagnetic area on the other device, a screw or a rivet in a device and a hole in the other device, docking means, etc.

Figure 12:
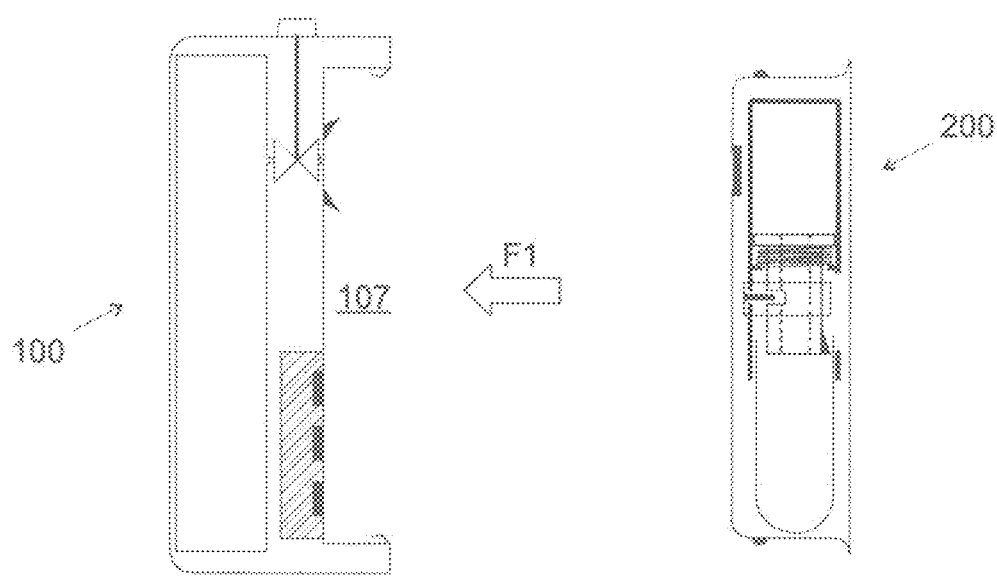
FIG. 12 shows a cross-section view of one embodiment of the system for extracting and collecting a sample of a fluid of a user according to the invention, wherein the sample collection device is inserted inside the sample extraction device.
Figure 13:
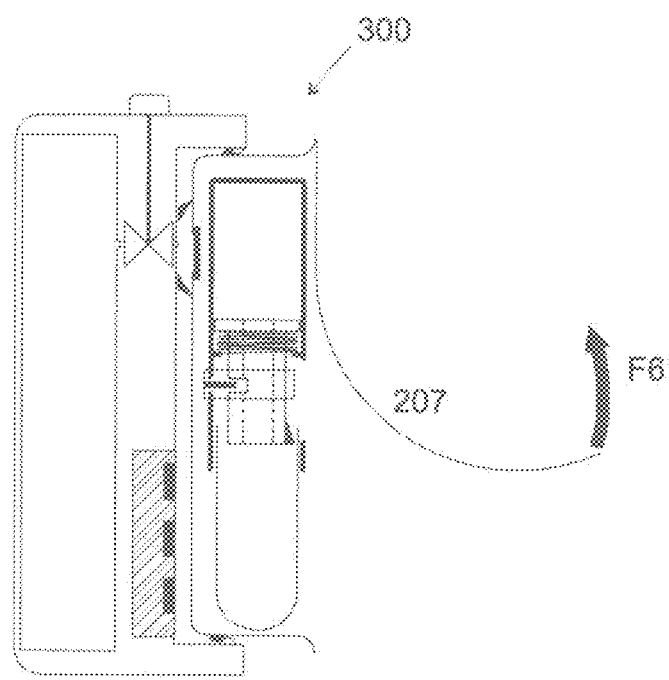
FIG. 13 shows a cross-section view of the embodiment of the system of FIG. 12, wherein the lid of the sample collection device is removed.

FIG. 12 shows a cross section view of one embodiment of the system for 300 extracting and collecting a sample of a fluid of a user according to the invention, before that the sample collection device 200 is inserted in the port 107 of the sample extraction device 100. The arrow F1 indicates the movement of the sample collection device 200 to the sample extraction device 100.

The sample collection device 200 and the sample extraction device 100 form the system 300 according to the invention.

Although FIG. 12 illustrates an embodiment in which the sample collection device 200 is moved to the extraction device 100 in the direction of the arrow F1, this embodiment is not limitative and other possibilities can be imagined by the skilled person. For example, and in a non-limitative way, the sample collection device 200 could be slid in some (not illustrated) rails of the extraction device 100 in a direction perpendicular to the direction of the arrow F1. In such a case, the illustrated first and second connection means 120 respectively 220 will be modified accordingly.

Figure 2:
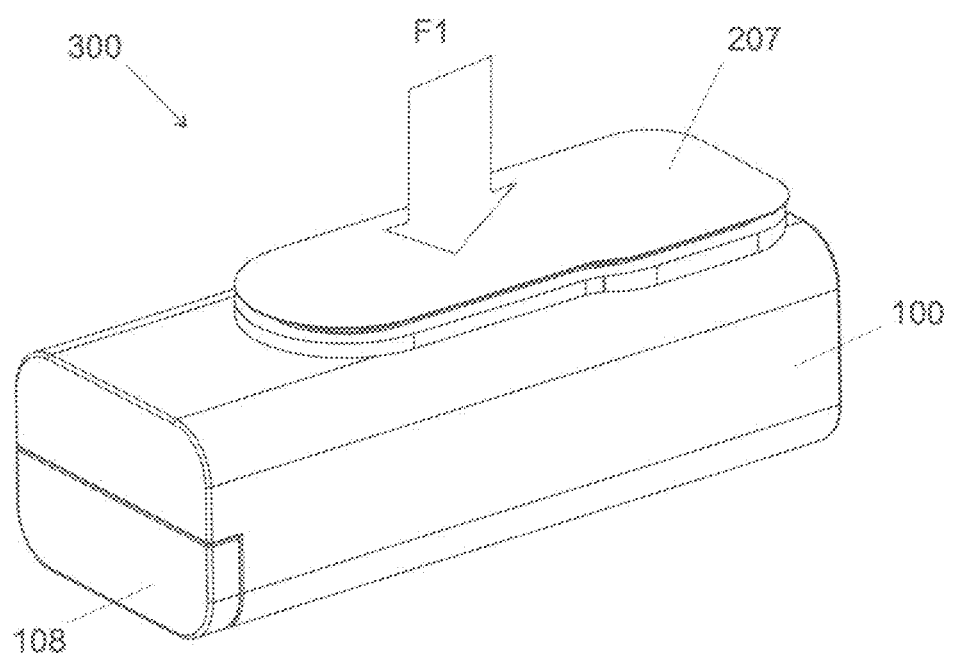
FIG. 2 shows a perspective view of the system for extracting and collecting a sample of a fluid of a user according to one embodiment of the invention.

FIG. 2 shows a perspective view of this system 300 according to one embodiment of the invention. In this case, the arrow F1 indicates the movement of the sample collection device 200 to the sample extraction device 100.

It must be noted that the sample collection device 200 and the sample extraction device 100 are arranged so that, when connected, the valve 104 and the possible gasket 103 of the sample extraction device 100 are placed in correspondence of the membrane 208 of the sample collection device 200; moreover, where present, the sensor(s) 106 of the sample extraction device 100 is(are) placed in correspondence of the sample container 212 of the sample extraction device 100.

The system 300 according to the invention is portable. Its size allows it to be easily handled by a hand of a user. In the embodiment of FIG. 2, it is substantially a parallelepiped. However, other shapes are possible, e.g. a cylindrical shape. In another embodiment, its length is in the range of 5 cm to 20 cm, e.g. 10 cm.

Figure 3:
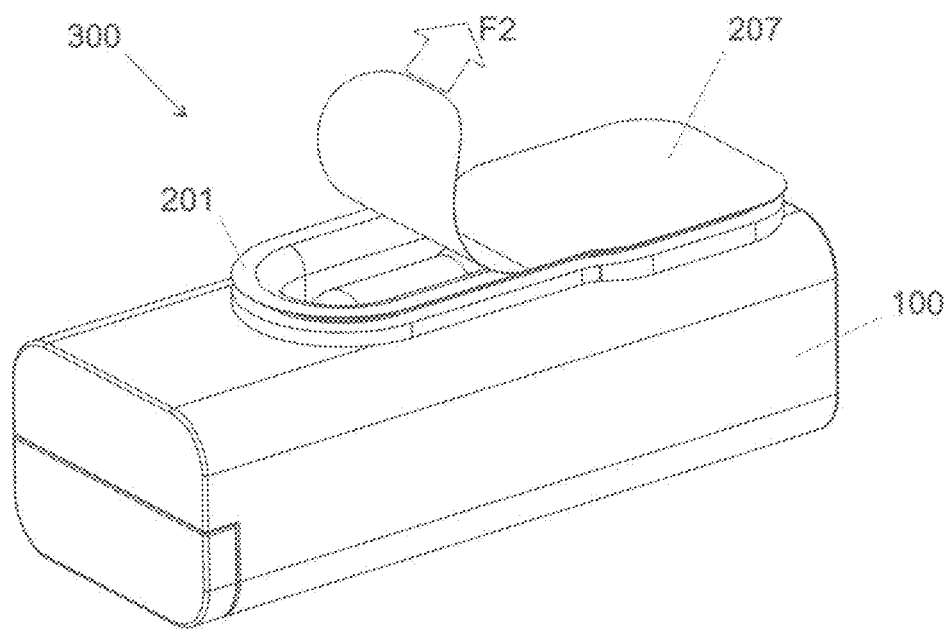
FIG. 3 shows a perspective view of the system of FIG. 2, and in particular the removing of its lid.

Then, the user (or an operator) removes the lid 207 of the suction pack 201, as illustrated in FIG. 3 (arrow F2) or 13 (arrow F6). The lid 207 guarantees the sterility of its content. As will be discussed, a membrane 208 of the sample collection device 200 contributes as well to prevent cross contamination of the fluid sample.

Figure 4:
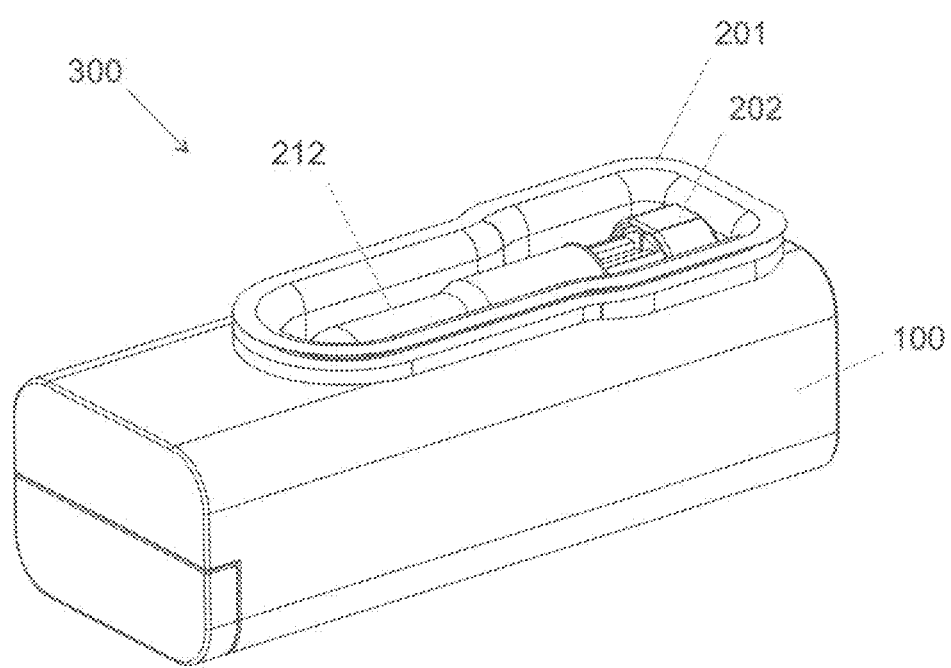
FIG. 4 shows a perspective view of the system of FIGS. 2 and 3, without the lid.

An embodiment of the system 300 without the lid 207 is illustrated in FIG. 4. In this embodiment, the suction pack 201 is (at least partially transparent) so that its content is visible.

As illustrated in FIGS. 5 and 6, then the user (or an operator) activates a vacuum creation mechanism 108 (a piston in this case, comprising a rod 109, which is moved in a direction F3 and then in the opposite direction F4) in the sample extraction device 100 so as to load vacuum into the vacuum chamber 101.

It must be noted that the creation of the vacuum in the vacuum chamber 101 can be performed also before the removing of the lid 207. In another embodiment, the vacuum does not need to be created by a user, e.g. by activating the vacuum creation mechanism 108, but it is already pre-packaged in the system 300 according to the invention. In other words, the system 300 comprises a chamber that is placed under vacuum in the manufacturing assembly line or in a healthcare facility. An example of this embodiment will be discussed with reference to FIG. 36.

Figure 7:
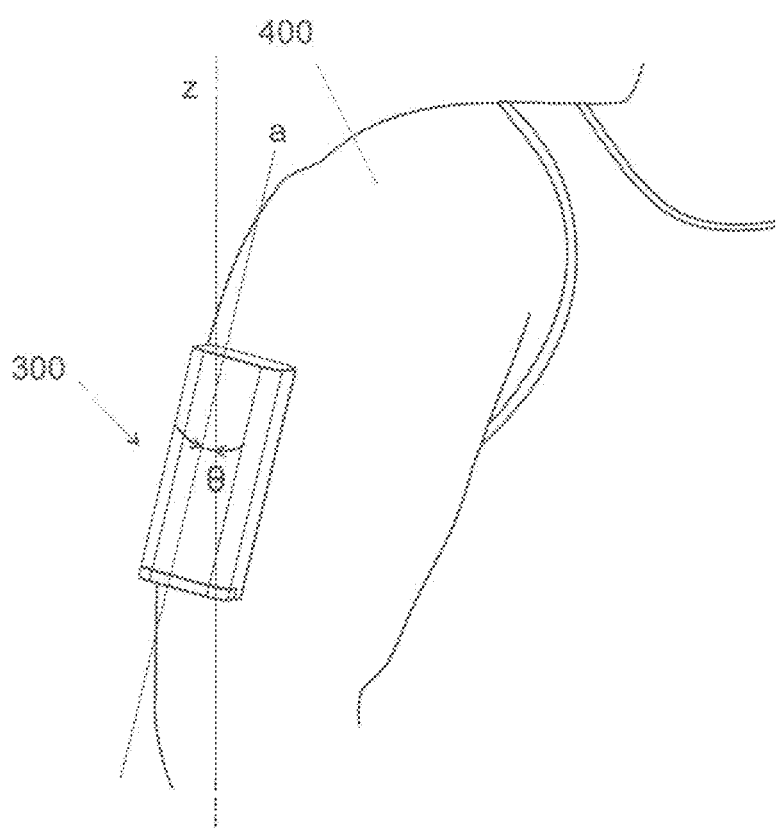
FIG. 7 shows a perspective view of one embodiment of the system according to the invention, placed on an arm of a user.
Figure 14:
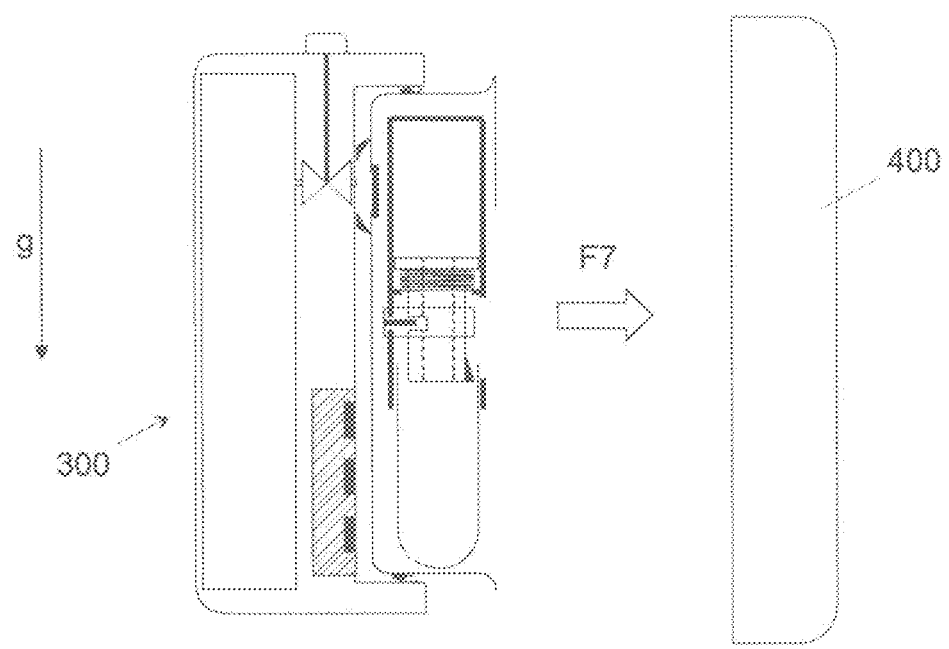
FIG. 14 shows a cross-section view of the embodiment of the system of FIG. 13, approaching a user, e.g. an arm of the user.
Figure 15:
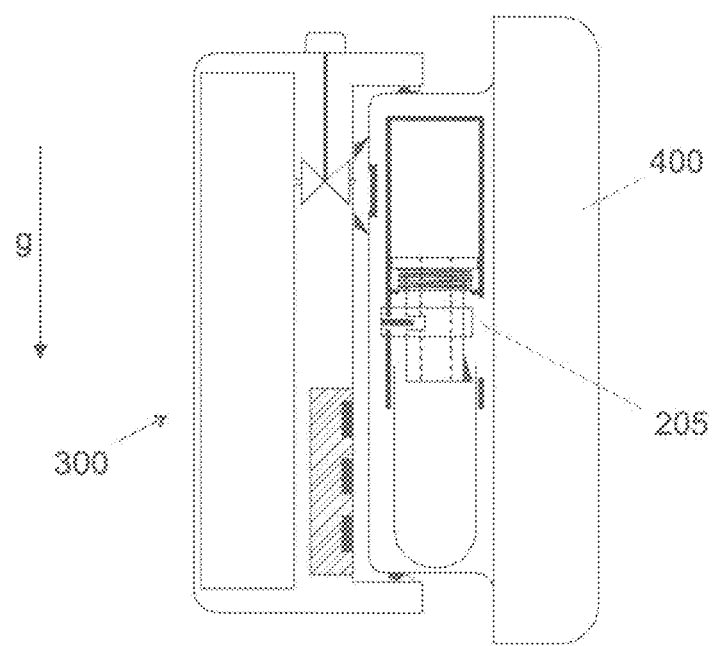
FIG. 15 shows a cross-section view of the embodiment of the system of FIG. 14, wherein the system is placed on the user.

Then, the system 300 approaches the user 400 (as illustrated in FIG. 14) and it is placed on the user 400, as illustrated in FIGS. 7 and 15.

It must be noted that in one embodiment, the system 300 according to the invention is placed on the user arm, in particular an arm kept vertical, in particular with an orientation so that the cap 202 is on top and the bottom of the sample container 212 is at the bottom with respect to the vertical. However, it could be placed also on other parts of the user (e.g. legs, body, etc.), as long as this part is kept substantially vertical (i.e. substantially parallel to the direction z of the force of gravity g) or forms a predetermined angle θ in the direction z. In particular, in one embodiment, the angle θ formed by the direction a of the main axis of the system 300 according to the invention and the direction z of the force of gravity g is comprised in the range 0°-45°. In fact, the system 300 advantageously exploits also the gravity force (in combination with the vacuum) for extracting the desired volume of the fluid sample.

Figure 16:
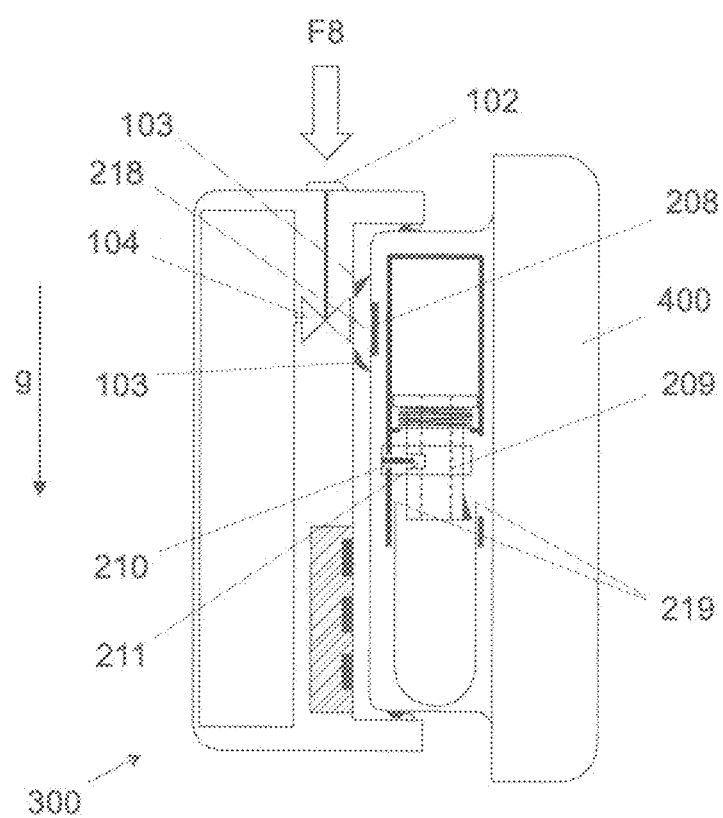
FIG. 16 shows a cross-section view of the embodiment of the system of FIG. 15, wherein the valve control mechanism is activated.

The user (or the operator) then actuates a valve control mechanism 102, which in the example of FIG. 16 is a push-button that is pushed in the direction of the arrow F8. Of course, other kinds of valve control mechanism 102 can be used instead of a push button, e.g. a rotatory button, etc.

The valve control mechanism 102 permits the opening of the valve 104 so as to transfer the vacuum from the vacuum chamber 101 of the sample extraction device 100 to the suction pack 201.

In a particular embodiment, this transfer is performed through an opening 218 in the suction pack 201, which is covered by a membrane 208 located in the suction pack 201. In one preferred embodiment, the membrane 208 is made of the same material as the lid 207 (e.g. Tyvek®).

This membrane 208 may protect the system 300 from blood contamination that could result in the growth of bacteria and cross-contamination between patients. In one embodiment, the membrane 208, while letting air go through, prevents bodily fluids like blood permeation.

The vacuum created in the suction pack 201 permits also to maintain the whole system 300 against the skin of the user.

Figure 17:
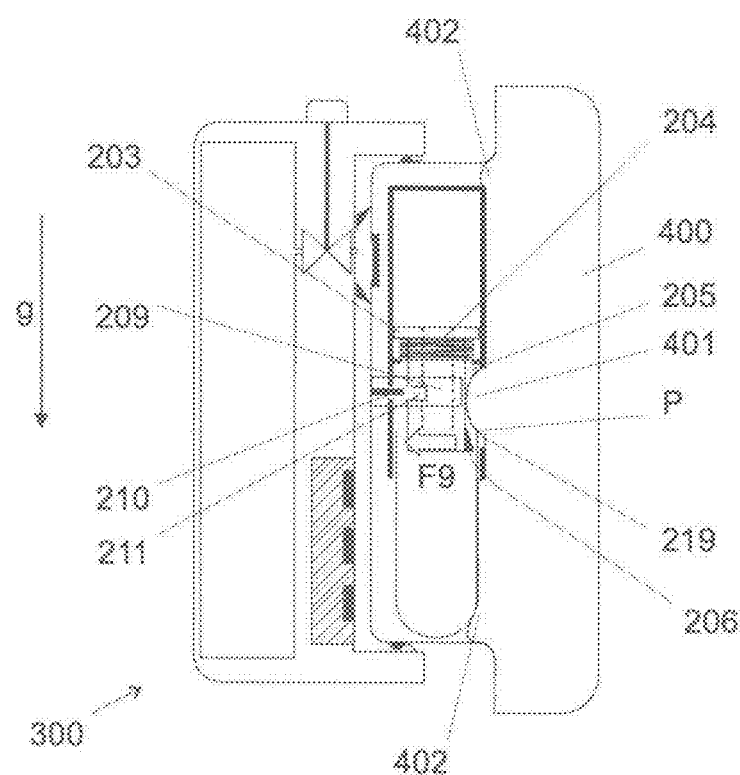
FIG. 17 shows a cross-section view of the embodiment of the system of FIG. 16, wherein the suction created by the vacuum stretches and deforms the user's skin.

It also stretches and/or deforms the user's parts 401 and 402, visible in FIG. 17, among which there is the user's part to be cut 401. The user's part to be cut 401 is the user's part which enters into contact with the collection window 205 of the sample collection device. The user's part to be cut 401, as stretched and/or deformed by the vacuum transferred in the suction pack 201, actuates the triggering mechanism that in turn triggers the incision mechanism.

In fact, as is visible in FIG. 17, the stretching and/or the deformation of the skin in the collection window 205 (i.e. the user's part to be cut 401) displaces the triggering element 209, which in the embodiment of FIG. 17 is a half-ring surrounding at least a part of the support element 23 (the piston in FIG. 17), so as to liberate the support element 23.

In fact, the movement of the triggering element 209 in the direction of the arrow F9 in FIG. 17 disengages the finger 209 from the cavity of notch 211 in the triggering element 209.

Figure 18:
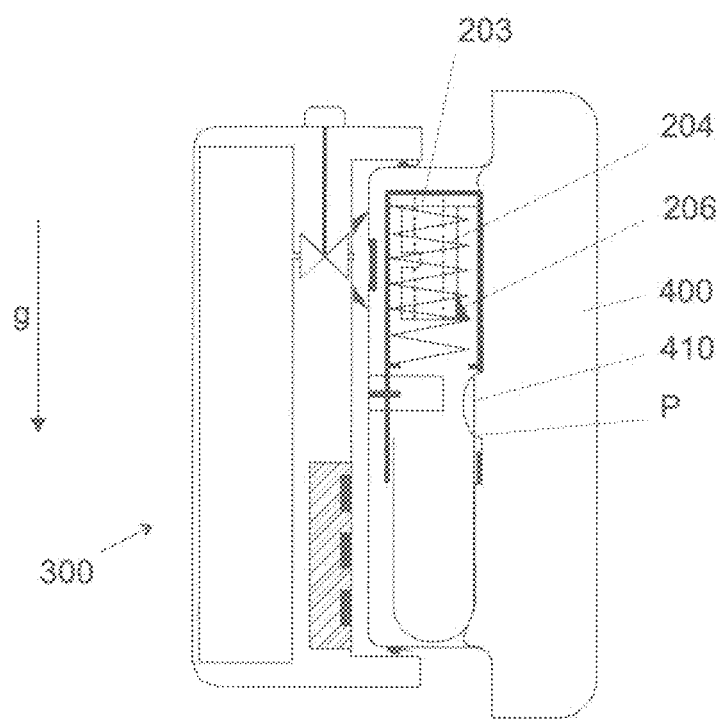
FIG. 18 shows a cross-section view of the embodiment of the system of FIG. 17, wherein the incision mechanism is in the second incision mechanism position and the user's skin has been incised by the incision mechanism.

Therefore, as illustrated in FIG. 18, the loaded elastic element 204 will displace the support element 203 of the incision mechanism inside the cap 202. In other words, the incision mechanism will be moved from a first incision mechanism position in the cap 202 (illustrated e.g. in FIG. 8 or 17) to a second incision mechanism position in the cap 202 (illustrated e.g. in FIG. 9 respectively 18). As the support element 203 of the incision mechanism is connected to the cutting element 206, during this displacement, this cutting element 206 will section a localized part 401 of the stretched and/or deformed skin in the collection window 205.

In other words, the incision is triggered by skin stretching and/or deformation upon applying vacuum in the suction pack 201: no user action is needed to trigger the incision. The system 300 ensures that the skin is sufficiently stretched and/or deformed before triggering the incision mechanism. The skin, when stretched and/or deformed, presses against the triggering element 209 which, when pushed, displaced or deformed, releases the support element 203 onto which the cutting element 206 is connected.

When released, the cutting element 206 moves along the (linear or circular) trajectory of the elastic element 204 to which it is attached and incises the skin on its trajectory.

In the embodiment of FIGS. 8 and 9, advantageously the movement of the incision mechanism from the first incision mechanism position to the second incision mechanism position is a linear movement (i.e. a translation) performed in a direction parallel to a surface of the user to be incised.

The incision into the skin is relatively shallow (less than 5 mm, in particular less than 3 mm into the skin, in length; the depth varies between 1 mm and 2 mm). The cutting element 206 makes a sharp cut into the skin. Moreover, the incision is advantageously made while applying vacuum and/or after vacuum is applied: the skin is deformed and/or stretched and/or pinched into the sample collection device 200 before performing the incision, which reduces the feeling of the pain of the incision.

Figure 19:
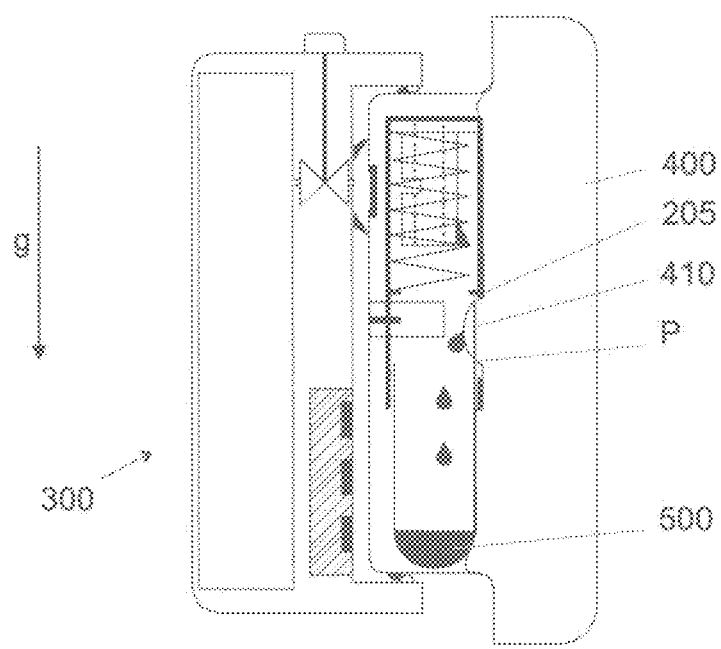
FIG. 19 shows a cross-section view of the embodiment of the system of FIG. 18, wherein the blood is flowing from the incision created by the incision mechanism.
Figure 20:
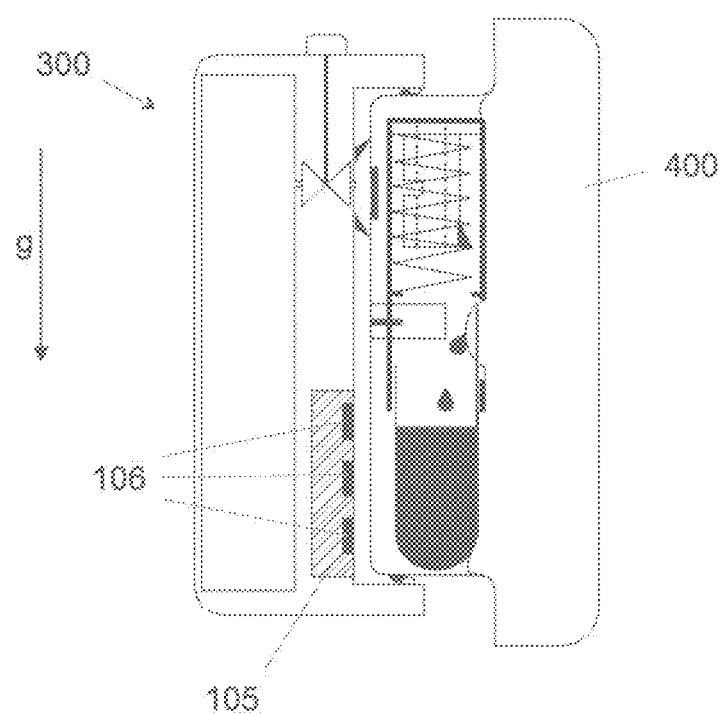
FIG. 20 shows a cross-section view of the embodiment of the system of FIG. 19, wherein according to one embodiment at least one sensor of the system announces the user once the volume of the sample in the sample container has reached a predetermined value.

In one embodiment, illustrated in FIGS. 17 to 19, at least a part of the edge 219 of the sample container 212 is in contact with the user 400 at a contact point or region P, at or under the incision on the user 400 made by the incision mechanism of the system 300. This contact point or region P guarantees that there is no space between the user 400 and the sample container 212, so that the fluid sample can fall down into the sample container 212. In other words, at least a part of the edge 219 is an edge of the collection window.

Advantageously, after the skin incision, the cutting element 206 is retracted into the cap 202, in particular into a cavity 216 visible in FIGS. 8 and 9, with no risk of injury or contamination to anyone handling the sample collection device 200.

In one preferred embodiment, the cutting element 206 is placed at an angle α (illustrated for example in FIG. 34) to maximize the surface cut, without increasing the incision depth. For example, the cutting element 206 can be positioned at a 90° angle with the skin, or it can be placed at a 45° angle with regard to the normal axis of the skin, maximizing the surface of the incision without increasing depth of the incision. In general, the plane containing the cutting element 206 can be positioned anywhere between 45° and 90° with regard to the plane of the skin of the user.

In one embodiment, the length of the trajectory of the cutting element 206 allows the cutting of more capillaries so as to maximize the blood flow.

The vacuum in the system 300 according to the invention has therefore three main functions: 1) it maintains the system 300 on the user during fluid sample collection; 2) it stretches and/or deforms the skin of the user creating a localized vasodilation of capillaries of the user; and 3) it extracts bodily fluid, e.g. blood from capillaries after the incision has been made.

To guarantee a good sealing between the skin of the user and the suction pack 201, and to maintain vacuum in the suction pack 201, two elements enter into play: first the better the skin stretches and/or deforms into the suction pack 201, the higher the surface between the skin and the edge of the suction pack 201 and the better the seal.

In order to favor a good stretching and/or deformation of the skin into the blister, the frictional forces between the skin and the suction pack 201 have to be minimized. This can be done e.g. by using the right surface properties of the suction pack 201 and materials inside the suction pack 201 and/or the coating of the suction pack 201 and materials inside the suction pack 201 and/or coating of the skin with a silicone gel, a silicone spray or any other lubricant.

Second, the seal between the skin and the suction pack 201 can be enhanced and better guaranteed if no air can penetrate between the skin and the suction pack 201. In one preferred embodiment, a silicone gel, a silicone spray, or any other lubricant placed between the suction pack 201 and the skin can play the role of a sealing agent. In other words, the materials chosen and the use of a lubricant on the suction pack 201 or on the skin will be used to enhance the vacuum.

As illustrated in FIG. 19, the fluid (e.g. the blood) flows from the incision created in the deformation window 205. A sealing edge (illustrated for example in FIGS. 31 and 33, reference number 219') ensures that fluid does not flow out of the sample container 212, the edge of the sample container 212 being positioned near the incision 401. The drops of fluid 500 formed at the incision point fall into the sample container 212 by exploiting the gravity force g.

Since the gravity force g, along with the vacuum, are both used for collecting the fluid sample 500, the system 500 according to the invention is designed to collect about 1 ml of fluid sample 500. Moreover, the sample container 212 has a size similar to the tubes used for venipuncture (e.g. diameter 13 mm), making it compatible with known blood analyzers.

Figure 21:
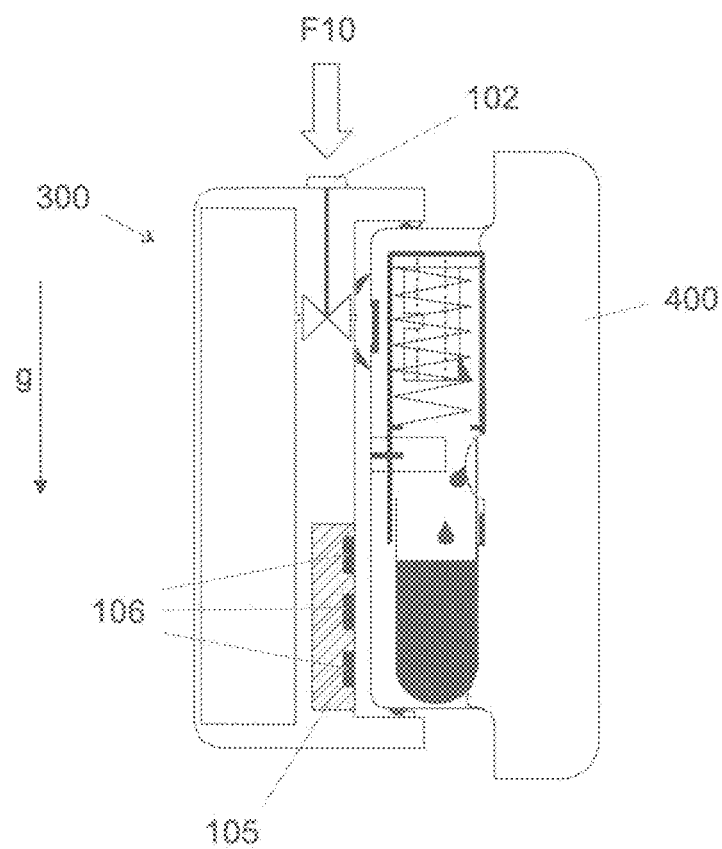
FIG. 21 shows a cross-section view of the embodiment of the system of FIG. 20, wherein according to one embodiment the valve control mechanism is pressed to re-equilibrate the system to atmospheric pressure.

In the embodiment of FIG. 21, the blood extraction device 100 comprises at least a sensor 106, e.g. an optical sensor in correspondence of the closed end 2121 of the sample container 212, so as to detect the fluid sample volume. In another embodiment (not illustrated), the sensor(s) 106 are placed in alternative or also on the sample collection device 200.

In one embodiment, once the fluid sample volume has reached a pre-determined value, the system 300 according to the invention indicates to the user (or the operator) the end of fluid sampling, e.g. by a light, a sound or any other appropriated signals.

After a sufficient amount of sample fluid has been collected, as shown in the embodiment of FIG. 21, the user (or the operator) presses the valve control mechanism 102 (or another valve control mechanism) to put back the system 300, and in particular the suction pack 201, at atmospheric pressure.

Figure 22:
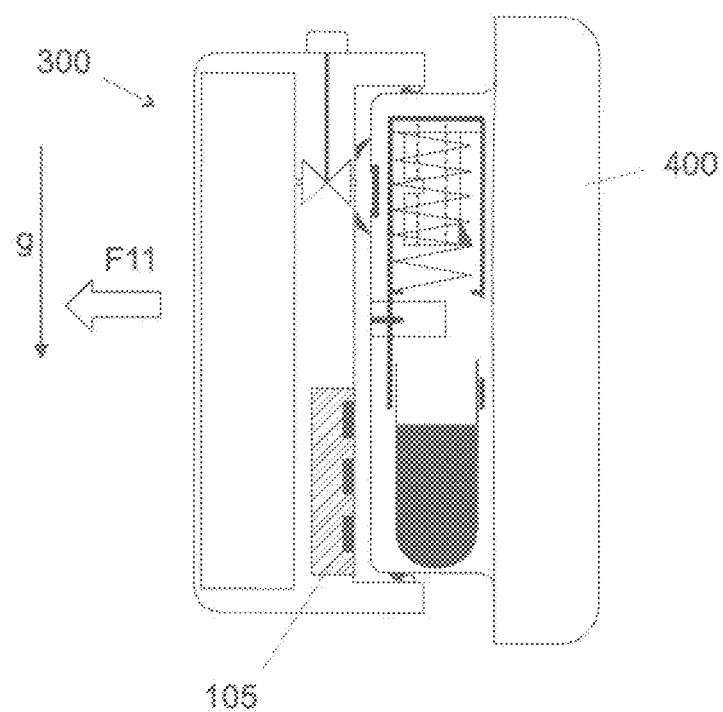
FIG. 22 shows a cross-section view of the embodiment of the system of FIG. 21, wherein the system is removed from the user.

As indicated by the arrow F11 in FIG. 22, the user (or the operator) removes the system 300 from the skin of the user 400.

It is therefore clear that the system 300 according to the invention is arranged to collect a bodily fluid without the need for high-skill training. It could be used by doctors, nurses, non-trained personnel, or by the user (i.e. the patient) himself. The system 300 is designed to require minimal action from the user. The system 300 is positioned on the user, preferably on his arm, kept vertical and pressed against the skin.

The user only actuates the valve control mechanism 102 to trigger a vacuum. The vacuum stretches and/or deforms the skin into the suction pack 201, maintaining it in place against the user. The user does not need to hold the system 300, he waits for the blood to be collected.

Once the required volume is collected, the user is informed by the system 300 and then actuates again the valve control mechanism 102 to return the system 300 to atmospheric pressure.

In one preferred embodiment, the time for collecting about 1 mL of bodily fluid is in the range of 1 min to 8 min, in particular 5 min.

In one embodiment, the rate with which the fluid, in particular blood, exits from the user once cut by the cutting element 206 of the system 300 is in the range 4 mg/s to 11 mg/s.

Figure 23:
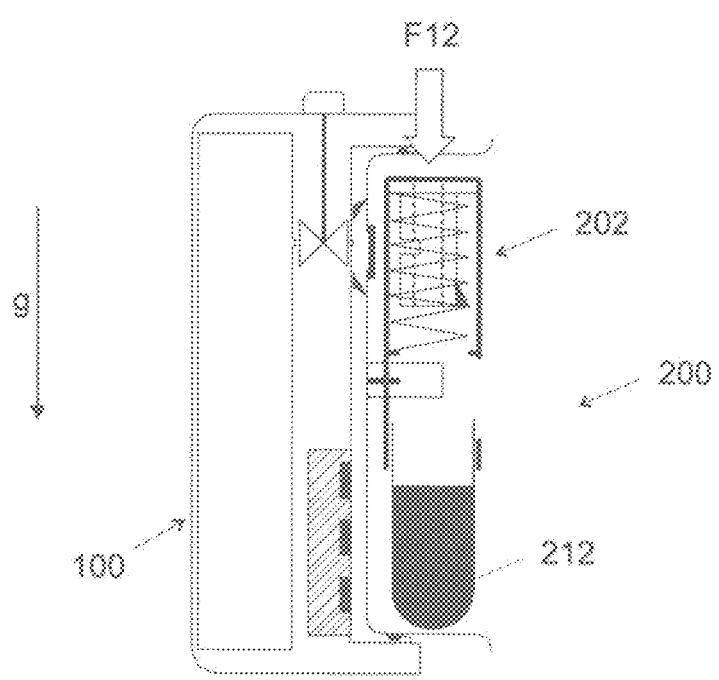
FIG. 23 shows a cross-section view of the embodiment of the system of FIG. 22, wherein the cap is moved to the second cap position.

Then, as illustrated in FIG. 23, the user (or the operator) moves the cap 202 onto the sample container 212 to seal it. In the illustrated embodiment, the cap 202 is moved when it is still in the suction pack 201, to avoid any spillage. In another embodiment, not illustrated, the cap 202 and the sample container 212 are taken out of the suction pack 201 and then the sample container 212 is sealed by the cap 202.

Figure 24:
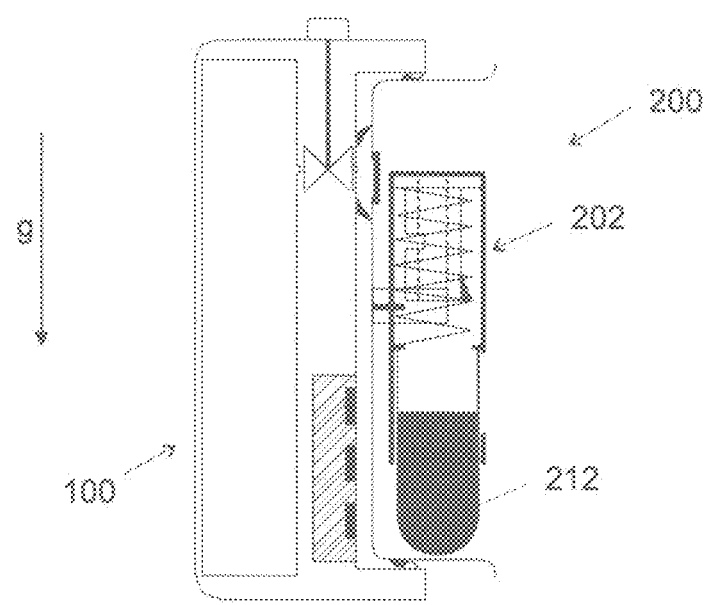
FIG. 24 shows a cross-section view of the embodiment of the system of FIG. 23, wherein the cap is in the second cap position and seals the sample container.

In the embodiment of FIGS. 23-24 (or FIGS. 10A-10B), the movement of the cap 202 from the first cap position to the second cap position is a linear movement, the cap 202 sliding onto (the outer surface of) the sample container 212 during this linear movement, as illustrated by the arrow F12 in FIG. 23.

However, in another embodiment (not illustrated), the movement of the cap from the first cap position to the second cap position is in complement or in alternative a circular movement. For example, the cap 202 can be screwed onto (the outer surface of) the sample container 212.

Figure 25:
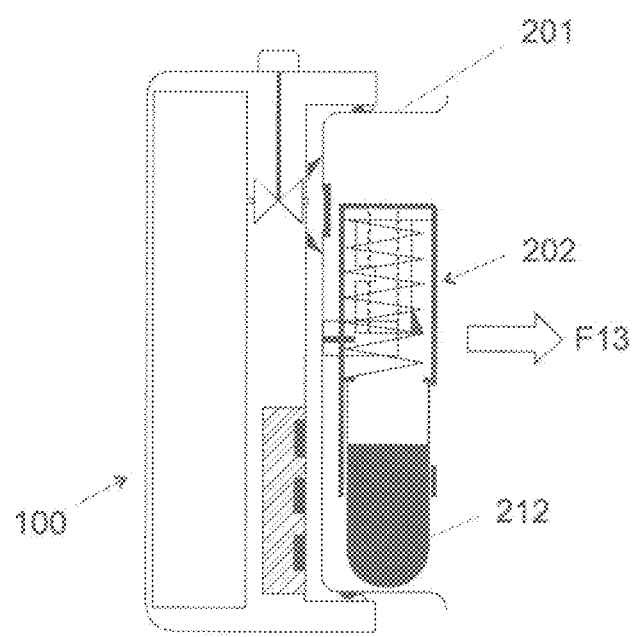
FIG. 25 shows a cross-section view of the embodiment of the system of FIG. 24, wherein the sealed sample container is removed from the suction pack.

As illustrated in FIG. 25, the sealed sample container 212 can be removed from the suction pack 201 and it is ready for transport and for sample analysis.

Figure 26:
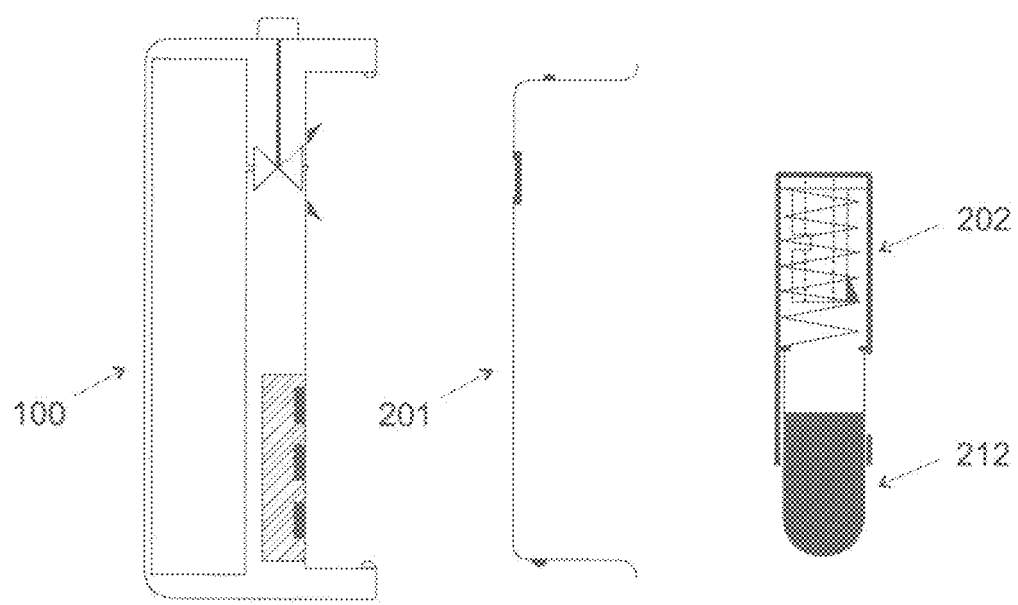
FIG. 26 shows a cross-section view of the embodiment of the system of FIG. 25, wherein the suction pack is removed from the sample extraction device.

As illustrated in FIG. 26, the suction pack 201 can then be removed from the sample extraction device 100.

In another embodiment, not illustrated, the suction pack 201 is first removed from the sample extraction device 100, and them the sample container 212 with the cap 202 are removed from the suction pack 201.

In the embodiment of FIG. 28, the sample collection device 100 may be used for combining sample collection and testing. In this case, the sample container 212 located in the sample collection device 100 may contain one or several biomarkers pads 214 reacting with the fluid sample, allowing a direct analysis of the fluid sample by the system 300. The chemical reaction will produce a signal, e.g. a visible signal (light, color, etc.) which is proportional to the concentration of the target to the measuring in the fluid sample (non-exhaustive list: e.g. fluorescence, reflectance photometry, etc.). The change in color is captured by the sensor(s) 106 of the sample extraction device and converted into a concentration.

In the embodiment of FIG. 29, the sample collection device 200, in particular the sample container 212, comprises an ID element 217, e.g. a QR code, a barcode, a number, a RF tag etc.

In another embodiment, the sample collection device 200 and/or the sample extraction device 100 is (are) arranged so as to store data e.g. blood collection data (such as time of blood collection, level of blood collected, etc.), patient information, sample container barcodes, doctor's prescription data, and the like.

In another embodiment, the sample collection device 200 and/or the sample extraction device 100 is (are) arranged so as to communicate with external devices, in particular portable devices (e.g. smartphones, tablets, etc.) or also to cloud services to which the data can be transferred.

It must be noted that the different features illustrated in the embodiments of FIGS. 1 to 29 (e.g. the trigger element 209 being a half-ring surrounding at least a part of the support element 203, the sample container 212 entering into the cap 202, the linear movement of the incision mechanism, etc.) are not necessarily all present. In other words, different embodiments can be imagined by the skilled person, in which not all the illustrated features are together present.

Figure 30:
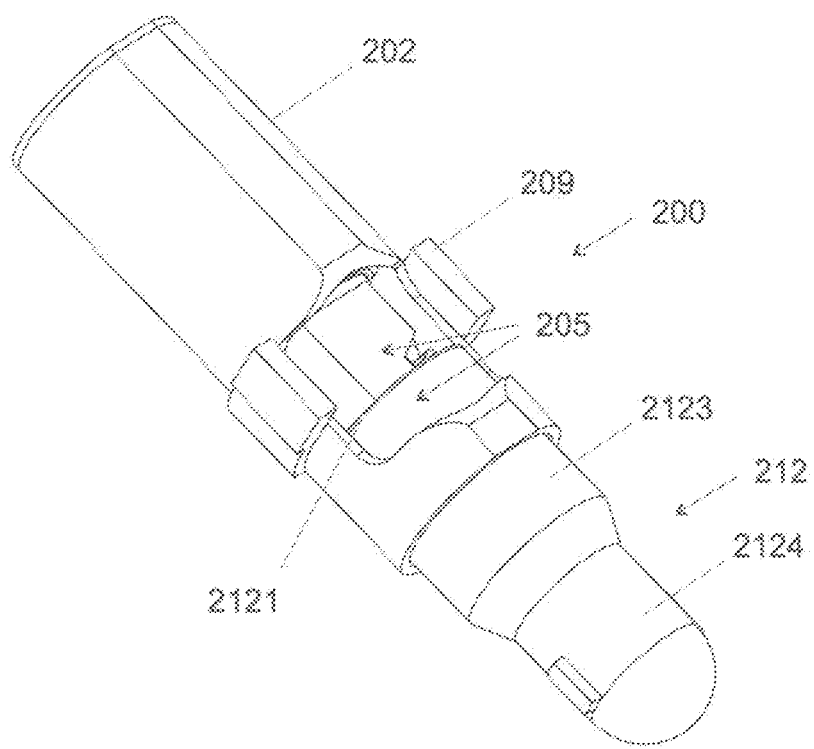
FIG. 30 shows a perspective view of another embodiment of the sample collection device according to the invention.
Figure 31:
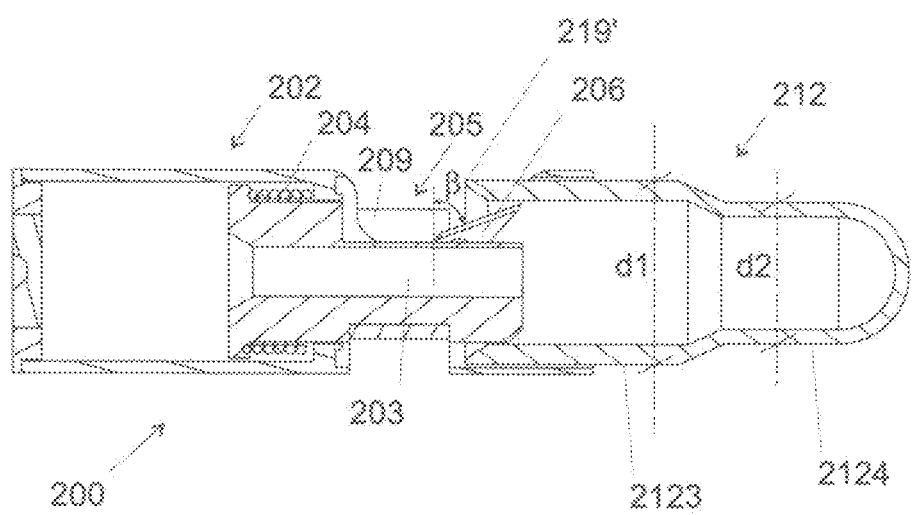
FIG. 31 shows a cross-section view of the embodiment of the sample collection device of FIG. 30.

FIGS. 30 and 31 show a perspective view respectively of a cross-section view of another embodiment of the sample collection device 200 according to the invention. In the illustrated embodiment, the trigger element 209 is a demi-ring over the cap 202. In this embodiment, the blade 206 is inclined at an angle β with regard to the normal axis of the skin (which correspond to the normal axis of the piston 203 when the system 300 is placed on the user's skin), this angle being different than 90°. This allows the cutting element to enter more tangentially into the user's skin. In this embodiment, moreover, the cap 202 is over a part of the sample container 212. In other words, the cap 202 does not enter into the sample container 212, but rather the sample container 212, in particular at least its end 2121, enters into the cap 202. Finally, in this embodiment, the sample container 212 comprises at least two portions 2123, 2124, having different diameters d1 and respectively d2. In one particular embodiment, the diameter d1 is a standard diameter according to the definition given above.

It must be noted that the different features illustrated in the embodiment of FIGS. 30, 31 (e.g. the trigger element 209 being a demi-ring over the cap 202, the sample container 212 entering into the cap 202, the sample container 212 comprising two portions 2123, 2124, the inclined blade 206, etc.) are not necessarily together present. In other words, different embodiments can be imagined by the skilled person, in which not all the illustrated features are together present.

For example, it is possible to imagine a sample collection device 200 in which the trigger element 209 is a demi-ring over the cap 202, the sample container 212 enters into the cap 202, the blade 206 is inclined but the sample container 212 comprises a single portion. Moreover, the embodiment of FIGS. 30, 31 can be combined with any of the other previously or later described embodiments.

Figure 32:
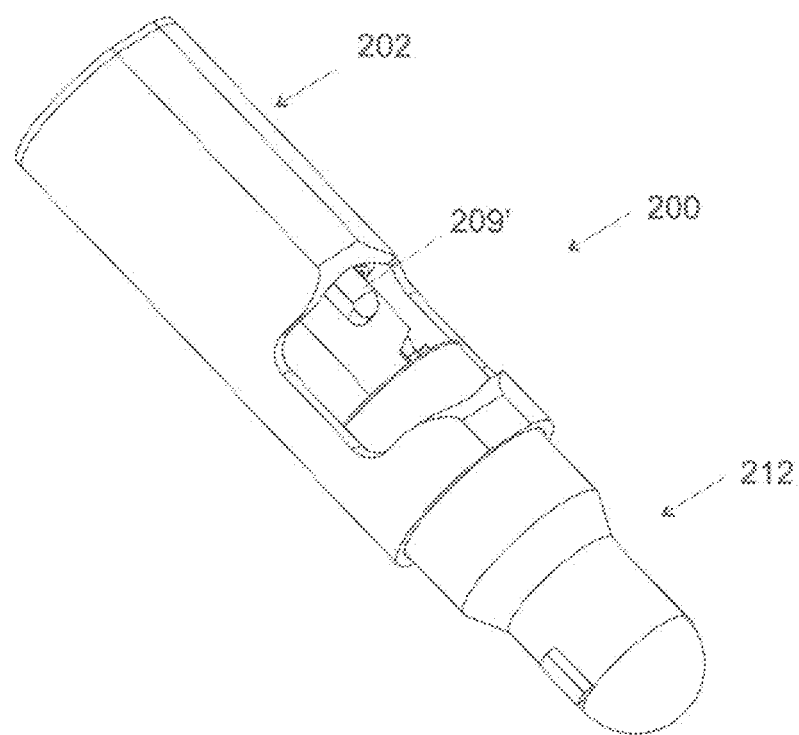
FIG. 32 shows a perspective view of another embodiment of the sample collection device according to the invention.
Figure 33:
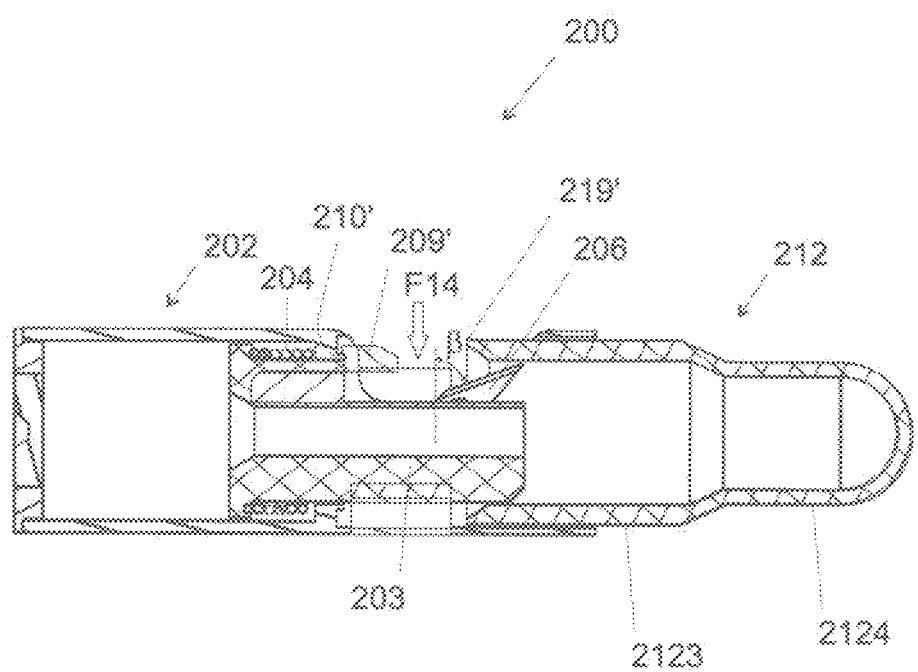
FIG. 33 shows a cross-section view of the embodiment of the sample collection device of FIG. 32.
Figure 34:
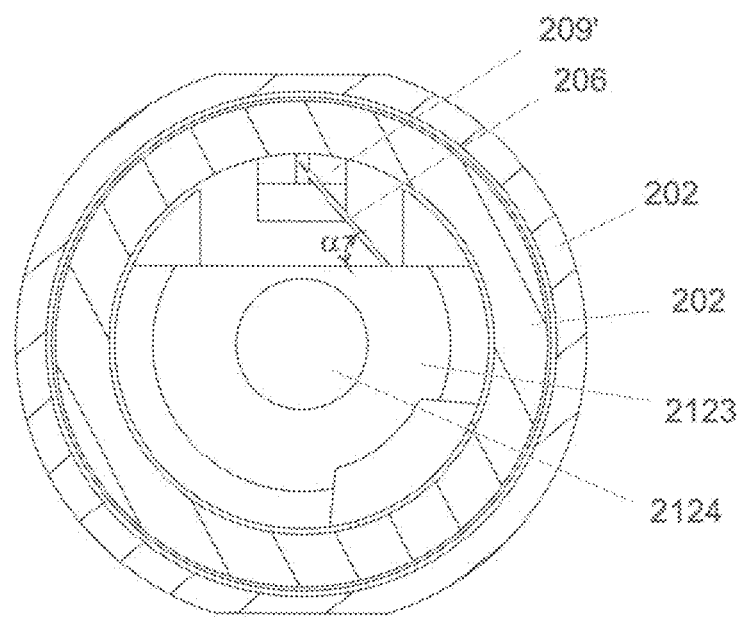
FIG. 34 shows another cross-section view of the embodiment of the sample collection device of FIG. 32.

FIGS. 32, 33 and 34 show a perspective view respectively cross-section views of another embodiment of the sample collection device 100 according to the invention. In the illustrated embodiment, the trigger element 209 is not a demi-ring over the cap 202, as in FIGS. 30 and 31.

In this embodiment, the trigger element 209 is a tab 209' in the cap 202, which is held in place by the finger 210'. The skin of the user, once deformed by the vacuum, will move the tab 209' in the direction of the arrow F14, by liberating the tab 209' from the finger 210' so as to liberate the elastic element 204 and therefor the piston 203 with the cutting element 206.

In the embodiment of FIGS. 32, 33, and 34, the blade 206 is inclined at an angle β with regard to the normal axis of the skin, this angle being different from 90°, as in FIGS. 30 and 31. In this embodiment, the cap 202 is over a part of the sample container 212, as in FIGS. 30 and 31. Finally, in this embodiment, the sample container 212 comprises two portions 2123, 2124, having different diameters d1 and respectively d2 as in FIGS. 30 and 31. Again, the features illustrated in the embodiment of FIGS. 32, 33 and 34 are not necessarily all present. Moreover, the embodiment of FIGS. 32, 33 can be combined with any of the other previously or later described embodiments.

Figures 35A, 35B:
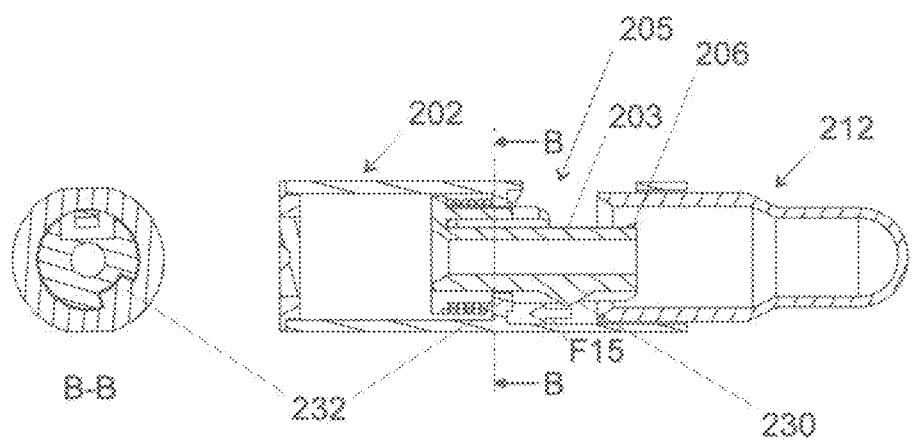
FIG. 35A shows a cross-section view a part of another embodiment of the sample collection device according to the invention.
FIG. 35B shows another cross-section view of the embodiment of the sample collection device of FIG. 35A.

FIGS. 35A and 35B show cross-sectional views of another embodiment of the sample collection device 200 according to the invention. In this embodiment, the support element 203 comprises a protrusion 230, which, once the support element is moved in the direction of the arrow F15 by the triggering mechanism, will enter into contact with the finger 232 of the cap 202: this will cause a mechanical movement of all of the support element 203, and then of the cutting element 206, toward the user's skin, so that the cutting element will move toward the user's skin while cutting it. In such a way, a deeper cut could be realized in the user's skin. The shape and the size of the protrusion 230 and/or of the finger 232 are selected so that the movement of the cutting element 206 toward the user's skin is performed while the cutting element 206 is cutting the user's skin. Other means can be imagined in order to move the cutting element 206 toward the user's skin while it cuts the skin. This embodiment can be combined with any of the other previously or later described embodiments.

Figure 36:
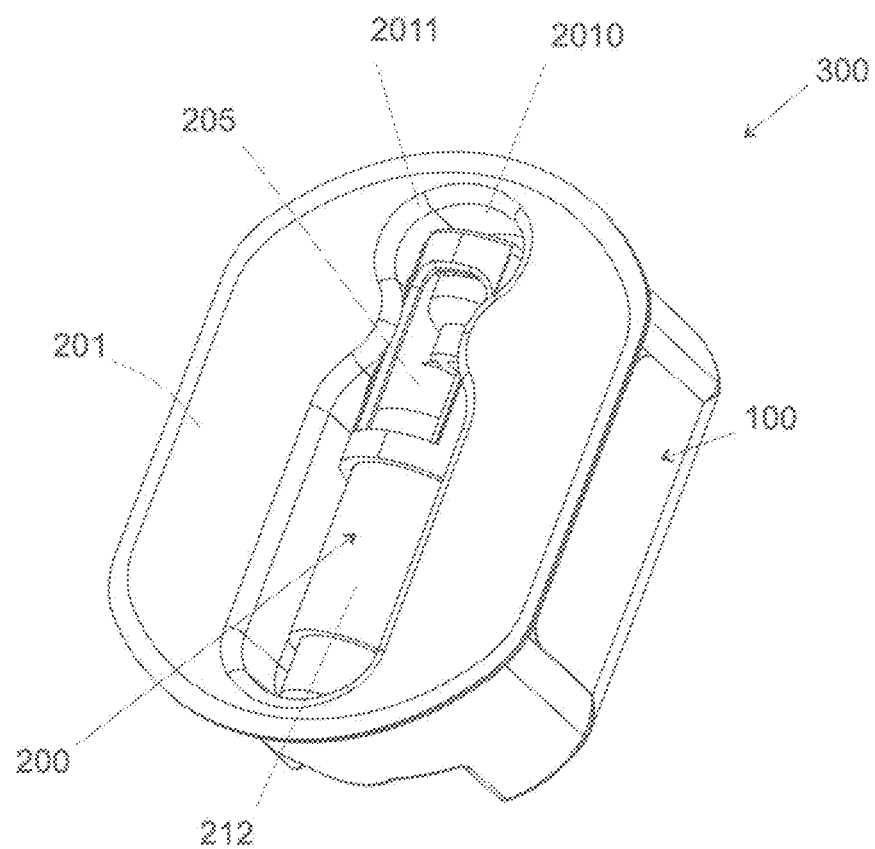
FIG. 36 shows a perspective view of another embodiment of the system for extracting and collecting a sample of a fluid of a user according to the invention.

FIG. 36 shows a perspective view of another embodiment of the system 300 for extracting and collecting a sample of a fluid of a user according to the invention.

In this embodiment:
the system 300 is fully consumable/disposable;
the vacuum is already pre-packaged in the system 300;
the triggering mechanism is configured so as to perform a circular movement;
the incision mechanism is configured so as to perform a circular movement;
the suction pack comprises an opening which is narrow near or at the collection window;
the lid is not permeable; and
the part(s) in contact with the skin is(are) adapted so as to fit to the shape of the user contacting part; —etc.

However, it must be noted that the features illustrated in the embodiments of FIG. 36 are not necessarily all present. In other words, different embodiments can be imagined by the skilled person, in which not all of the illustrated features are present. Moreover, the embodiment of FIG. 36 can be combined with any of the other previously described embodiments.

Figure 37:
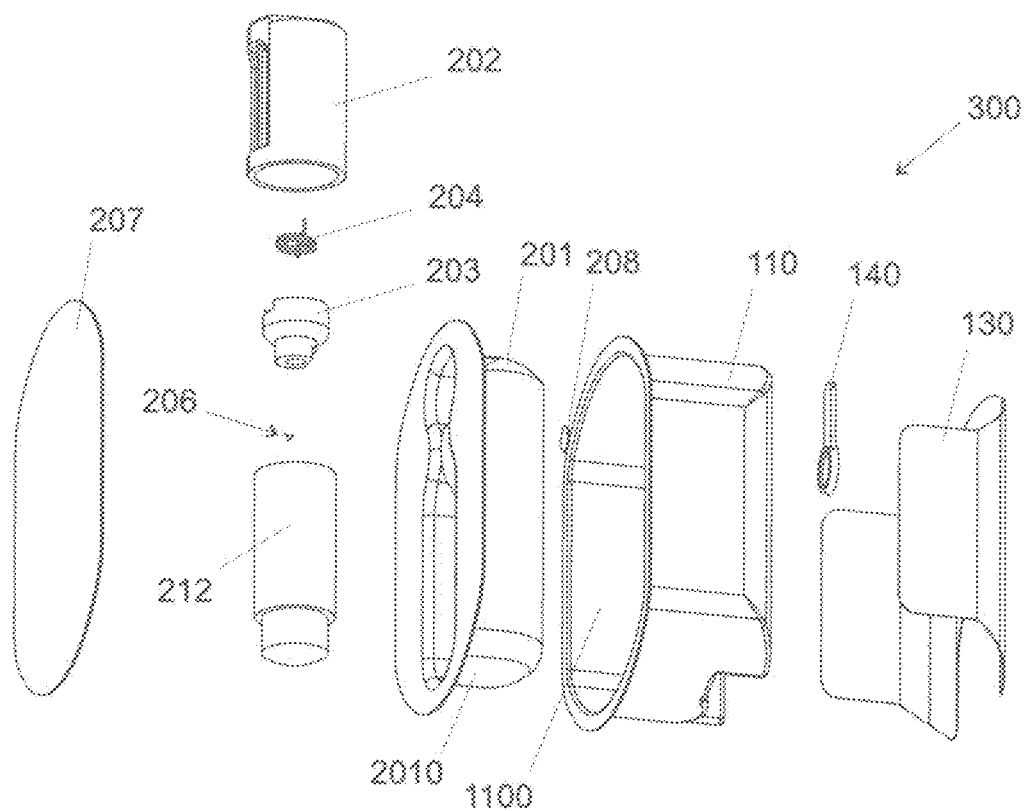
FIG. 37 shows an exploded view of the embodiment of the system of FIG. 36.

FIG. 37 shows an exploded view of the embodiment of the system 300 of FIG. 36. In this figure, the suction pack 201 present in the previously described embodiments is a first suction pack 201 (or inner suction pack 201), and the system 300 comprises a second suction pack 110 (or outer suction pack 110).

The first suction pack 201 comprises a cavity 2010 arranged to receive the sample container 212 and the cap 202 and having a first thickness. The second suction pack 110 comprises a cavity 1100 having a second thickness, which is greater than the first thickness. The first suction pack 201 is arranged to be received by the second suction pack 110, so that the difference between the two thicknesses creates a chamber that is placed under vacuum in the manufacturing assembly line or in a healthcare facility. In other words, the pre-packaged vacuum is made by adding a second suction pack 110 on top of the first suction pack 201 so to create this chamber.

The first and second suction packs are arranged so that, once the second suction pack 110 receives the first suction pack 201, they can be permanently sealed together.

The system 300 of the embodiment of FIG. 37 comprises also means for transferring the vacuum from the chamber placed under vacuum in the manufacturing assembly line or in a healthcare facility (in the following, second vacuum chamber) to the first vacuum chamber 101, once a user wished to activate the system 300.

In one embodiment, the second suction pack 110 comprises a bistable element (as a button) on one of its outer surfaces. An example of such bistable element is visible in FIG. 38, which shows a part of a cross-section view of the embodiment of the system of FIGS. 36, 37.

In this embodiment, the first suction pack 201 comprises also a piercing protrusion (reference 2014 in FIG. 34). Once a user activates the bistable element 2012, e.g. pressing on the second suction pack 110, the piercing protrusion 2014 will pierce a membrane 208 placed on the first suction pack 201, thereby transferring the vacuum in the first vacuum chamber or collection chamber. This will start the collection of the liquid sample. In one preferred embodiment, this membrane is non-permeable, so as to avoid a vacuum transfer before the use of the system 300.

In one embodiment, the second suction pack 110 comprises also one or more holes 2010, completely covered by a removable cap 140, e.g. a rubber removable cap 140. In order to stop the collection of the liquid sample, the user can remove, e.g. by pulling, the removable cap 140 so as to lower the pressure in the collection chamber to the atmospheric pressure, thereby stopping the start of the collection of the liquid sample.

In the example of FIG. 36, a (removable) label 130 can cover the back of the second suction pack 110.

FIG. 39 shows another part of another cross-section view of the embodiment of the system of FIG. 36. In the illustrated embodiment, the cutting element 206 makes an incision in the skin of the user by moving into a rotational movement around the main central axis of the tube (and cap 202). This rotational movement allows a more compact triggering and incision mechanism. In fact, by choosing a rotational movement of the cutting element 206, the overall length of the triggering mechanism is reduced, allowing for a smaller dimension of the cap 202 and a smaller overall system 300.

In one embodiment, the cap 202 comprises on its top one or more deformable elements 2020, visible in FIG. 39, which is(are) arranged to be deformed in the direction of the arrow F16. The deformable element(s) 2020 is(are) part of the triggering mechanism. Upon applying vacuum, the skin is sucked into the chamber and presses against the deformable element(s) 2020 on the cap 202. By pushing the deformable element(s) 2020, the deformable element(s) 2020 free the rotational piston 203 previously loaded with a (torsion) spring 204.

Figures 41A, 41B:
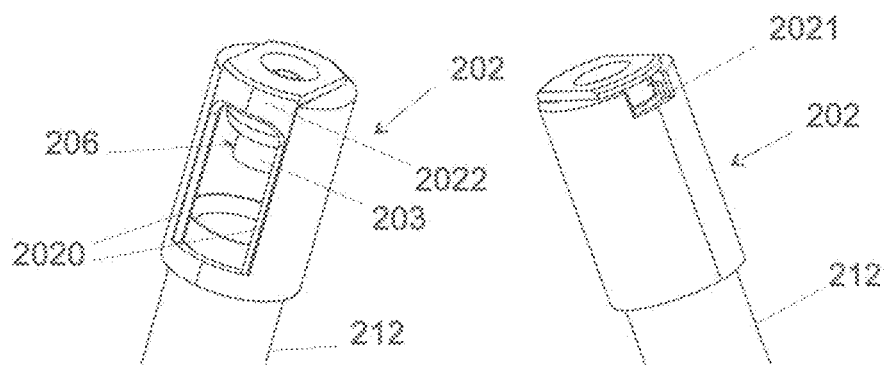
FIG. 41A shows a perspective view (front side) of one embodiment of the sample collection device of the system of FIG. 36.
FIG. 41B shows a perspective view (rear side) of the embodiment of the sample collection device of FIG. 41A.

FIG. 41A shows a perspective view (front side) of one embodiment of the sample collection device of the system of FIG. 36. FIG. 41B shows a perspective view (rear side) of the embodiment of the sample collection device of FIG. 41A. In the illustrated embodiment, the triggering element is part of the cap 202. In another embodiment the deformable elements 2020 belong to a supplementary piece, fixed (in a movable or unmovable way) to the cap 202. The deformable elements 2020 are larger than in previous variants, for a wider area of contact between the skin and the triggering mechanism permitting to have more reliability in the triggering mechanism.

In this embodiment, the cap 202 comprises a liberation notch 2021. When vacuum is released, the skin will press the triggering surface 2022 of the cap 202, by pushing the notch 2021 and setting the piston 203 free.

Increasing the length of the collection window 205, allows an improvement in the skin stretching. Having a rotational movement of the cutting element 206 allows that the length of the incision is not dependent on the length of the collection window 205 (proportional the window's width), as it is the case with a translational movement of the cutting element 206.

By resuming, having a rotational movement of the cutting element 206 provides the following advantages:
  a more compact system 300;
  a more reliable triggering mechanism;
  a more controlled and defined skin stretching.

In one embodiment, as visible e.g. on FIG. 36, the cavity 2010 of the suction pack 201, arranged to receive the collection container 212, has a waisted shape, which is narrower at or near the collection window 205, in particular at or near the incision area, so as to allow for a better stretching of the skin. The applicant has noticed that the skin deforms well along the edges 2011 of the cavity 2010 of the suction pack 201. To maximize the skin deformation at or near the incision area, the edges of the cavity 2010 of the suction pack 201 are arranged closer to the incision area, by making it narrower.

Figure 42:
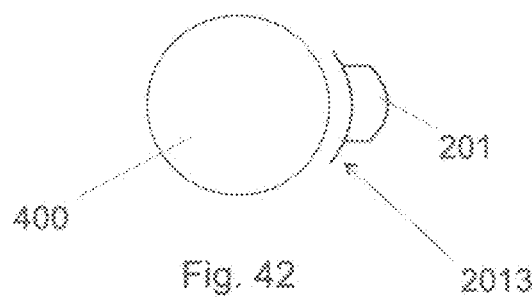
FIG. 42 shows a top view of the system according to the invention, once placed near a user's member as an arm.

FIG. 42 shows a top view of the system 300 according to the invention, once placed near a user's member as an arm.

In this embodiment, the suction pack 201, in contact with the skin, has a shape and/or a curvature 2013 to fit the shape and/or the curvature of the arm of the user 400 to ensure a better seal between the skin and the suction pack 201. In another embodiment (not illustrated), this shape and/or this curvature can be adapted or changed by the user, so as to better fit with the user, in particular with young users.

FIG. 43 to FIG. 49B show a further embodiment of a sample collection device 3200 for collecting a blood sample 3500 of a patient of the present invention. The sample collection device 3200 comprises the same structural and functional features and capabilities as the embodiments described above. It can be combined with one or several of the above-described features of the already described sample collection devices.

Similar or identical features are denoted with the same (or similar) reference numbers, whereas the value is increased by 3000 or in case of the embodiment shown in FIG. 36 to FIG. 42 increased by the value 2000.

Figure 43:
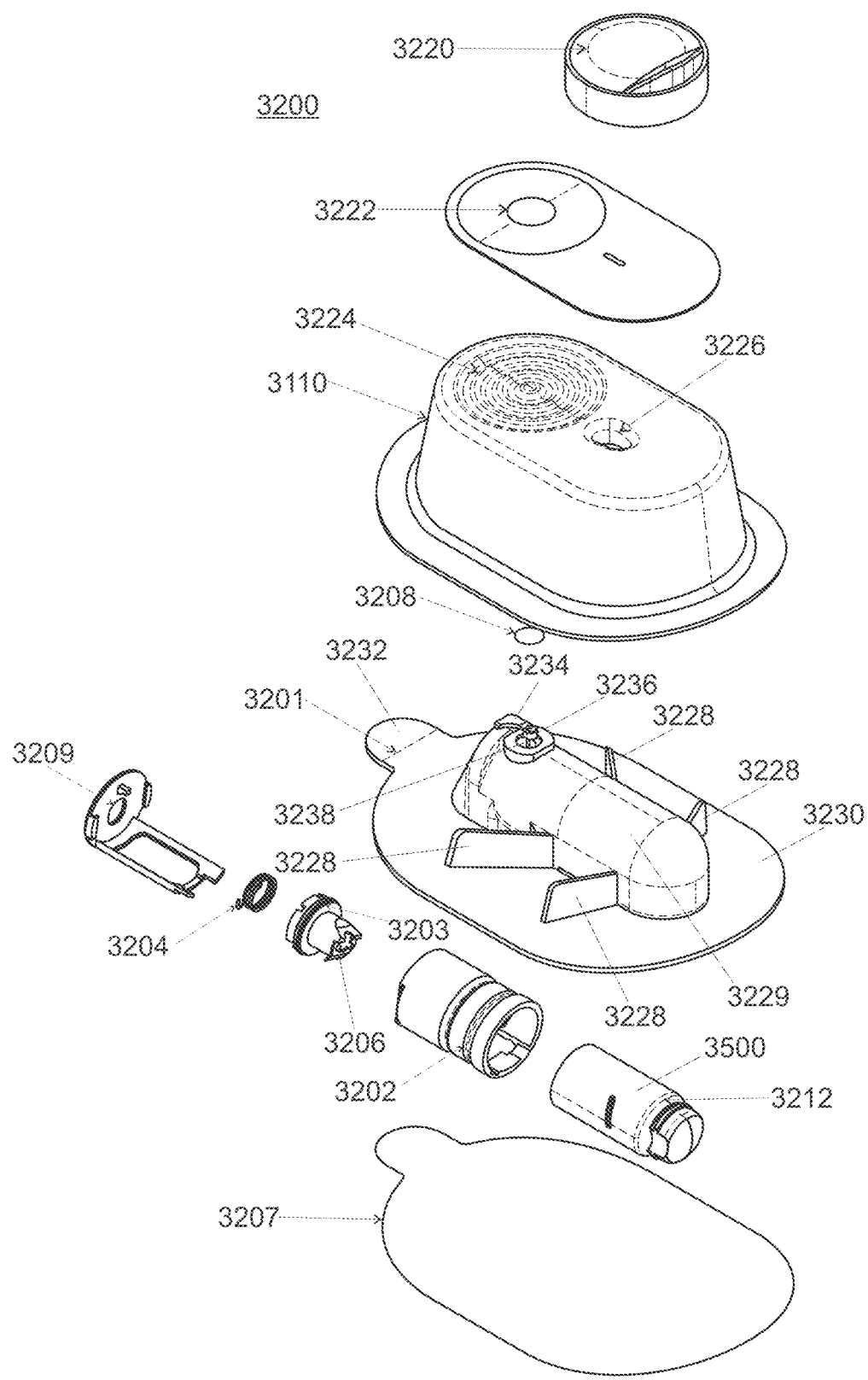
FIG. 43 shows an exploded view of a further embodiment of a sample collection device for collecting a blood sample of a patient of the present invention.

FIG. 43 shows an exploded view of a further embodiment of a sample collection device 3200 for collecting a blood sample of a patient of the present invention. The sample collection device 3200 comprises a first shell 3110 and a second shell 3201. The first shell 3110 is a partially deformable shell 3110. The shell 3110 comprises a deformable button 3224. The deformable button is integrally formed within the shell 3110. In this area, the shell is deformable in a predefined manner, i.e. such that it allows an elastic or plastic deformation by pressing in this section. The button 3224 has a size that is oriented on the size of human thumbprint. The diameter of the button 3224 in the shown embodiment is approx. 30 mm. Further, the shell 3110 has an electronic module port 3226. The electronic module port 3226 is formed integrally in the shell 3110. In particular, the electronic module port 3226 is formed by means of a recess. The electronic module port 3226 is configured for receiving and holding an electronic module 3220. The electronic module 3220 is an optional element. It can be reusable, whereas the rest of the sample collection device 3200 can be a disposable. The electronic module 3220 can comprise the sensors described in this disclosure (cf. especially description parts above).

The electronic module 3220 can comprise electronic components configured to execute computer-readable instructions for measuring blood volume, but also may be used for in-situ diagnostics. It can comprise at least one of the following elements, e.g. one or more sensors (of any kind such as temperature sensor, pH-sensor, pressure sensor etc.), one or more power storage units such as a battery, an electronic circuit, at least one communication module, at least one controller, at least one processor, at least one telemetry unit etc.

The second shell 3201 is a partially pierceable shell 3201. The partial pierceable portion is, however, provided by the membrane 3208, which is placed in the pierceable membrane position 3238. In this position, the membrane 3208 is firmly welded to the second shell 3201.

In the mounted state of the collection device 3200 there is a pre-packaged vacuum sealed between the first shell 3110 and the second shell 3201. Again, there is also a pierceable membrane 3208 as already describe above.

The second shell 3201 is configured such that in the mounted state a sample container 3212 and an automatic mechanical cutting mechanism are held by the second shell 3201. The second shell 3201 comprises a base plate 3230 with stabilization ribs 3228 and a main holder recess 3229. The ribs 3228 prevent collapsing of the first shell 3110 under vacuum.

There can be also different arrangements and designs of the ribs. In particular, there can be also a rib design having e.g. at least one circumferential rib encircling the main holder recess 3229. Then the rib can encircle the main holder recess 3229 with the form of an oval. The rib(s) 3228 can be positioned vertical to the base plate 3230.

In the base plate 3230, there is a collection opening 3231. As already described, the collection opening comprises a narrow portion in the area of the cutting mechanism. The narrow portion is formed by rounded protrusions 3230*a* of the base plate 3230. The function of this narrow portion is already explained above in greater detail. It facilitates the blood collection and incision process.

As can be seen e.g. in FIG. 45C and FIG. 45E, the base plate 3230 is curved to better fit and adjust to the skin surface of e.g. a human arm. The base plate 3230 can be made of a rigid plastic material (medical grade). All elements of the device 3200 are made of plastic (except the electronic module 3220 and the spring 3204 and the cutting blade 3206). On the outside of the main holder recess 3229, there is vacuum unlocking element 3234 in the form of a bendable arm carrying a piercing portion of vacuum unlocking element 3236. Further, as a part of the wall of the main holder recess 3229, there is a pierceable membrane 3208 placed in position 3208, welded firmly to the second shell 3201. It is made here in this embodiment of aluminum but can be any other suitable material. The membrane 3208 is arranged such that it can be pierced by means of the vacuum unlocking element 3236. The base plate 3230 also comprises a handle portion 3232. With the handle portion, the sample collection device 3200 can be removed from the sample collection side when the collection process is finished. The handle portion 3232 or tab 3232 can be also formed on the first shell 3110 or on both the first shell 3110 and the second shell 3201.

To enclose and to ensure sterility of the automatic mechanical cutting mechanism and the sample container within the main holder recess 3229 of the second shell 3201, there is a lid 3207 (as already described above in connection with lid 207).

The automatic mechanical cutting mechanism comprises a trigger 3209, an actuator spring 3204 (here a torsion spring 3204), a plunger 3203 holding a cutting blade 3206, a cap 3202 and a sample container 3212.

The sample container 3212 is formed as a cylindrical tube with a closed and an open end, the open end being oriented to the cap and plunger 3203. The plunger 3203 further comprises a seal 3203*a* and a septum 3203*b*. The seal 3203*a* is formed as an O-Ring on the radial outside of the plunger 3203.

FIG. 44A-C show details of the device 3200 shown in FIG. 43, the details being related to the functionality of the device 3200.

In step S1, the user deforms the button 3224 of the blister 3110 (i.e. the first shell 3110), after he has put the device 3200 on the collection site, e.g. being located in the arm of the patient.

In step S2, the deformable arm 3234 (also deformable beam 3234) is deflected by this and pierces the aluminum membrane 3208 (placed in position 3238).

In step S3, the vacuum is liberated.

In step S4, the skin is stretched and pressed on the trigger 3209.

Figure 49A:
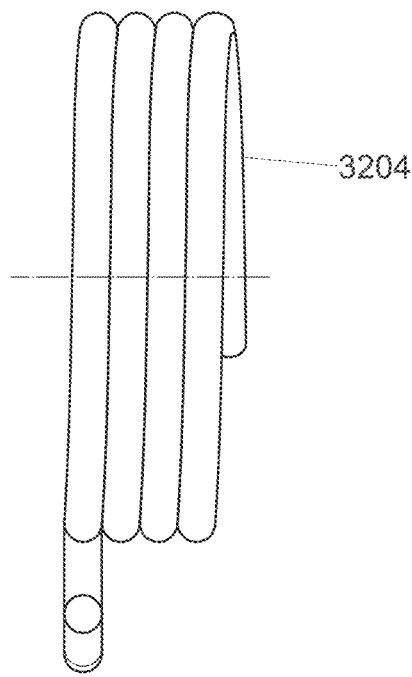
FIG. 49A-B different views of the torsion spring of the embodiment shown in FIG. 43.
Figure 49B:
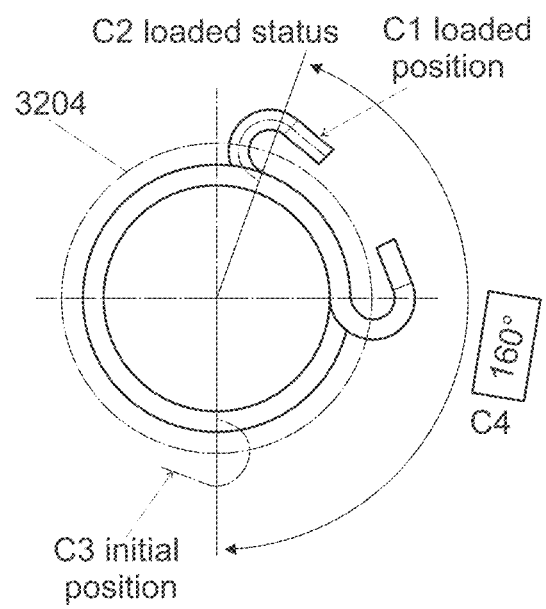

In step S5, the trigger 3209 liberates the spring-loaded plunger 3203, whereas the spring load is created by the torsion spring 3204 (cf. also FIG. 49A and FIG. 49B).

In step S6, the cutting blade 3206 firmly mounted to the released plunger 3203 rotates and creates an incision in the stretched skin.

In step S7, blood is flowing into the tube 3212 and is collected there.

In step S8, the user pulls the handle 3232 to stop the blood collection, thereby releasing the device 3200 from the skin. The closure of the tube 3212 is described below.

As shown in FIG. 46E, with the trigger 3209, the plunger 3203, the seal 3203*a* being engaged with the outer radial wall (radial outside) of the plunger 3203 and the inner wall of the tube 3212, the tube 3212 carrying blood 3500 can be closed and sealed.

Closing of the tube 3212 can be effected by simply putting a finger into the interspace 3240 (cf. FIG. 44C), then pressing all parts together and thereby closing and sealing the sample container.

FIG. 45A-E show different views of the device 3200 of FIG. 43.

FIG. 46A-E show different views of the sample container of the embodiment shown in FIG. 43 in connection with extension tubes 3250 (as already described above).

FIG. 47A-F show different views of the plunger 3203 and the cutting blade 3206 of the embodiment shown in FIG. 43.

Figure 48A:
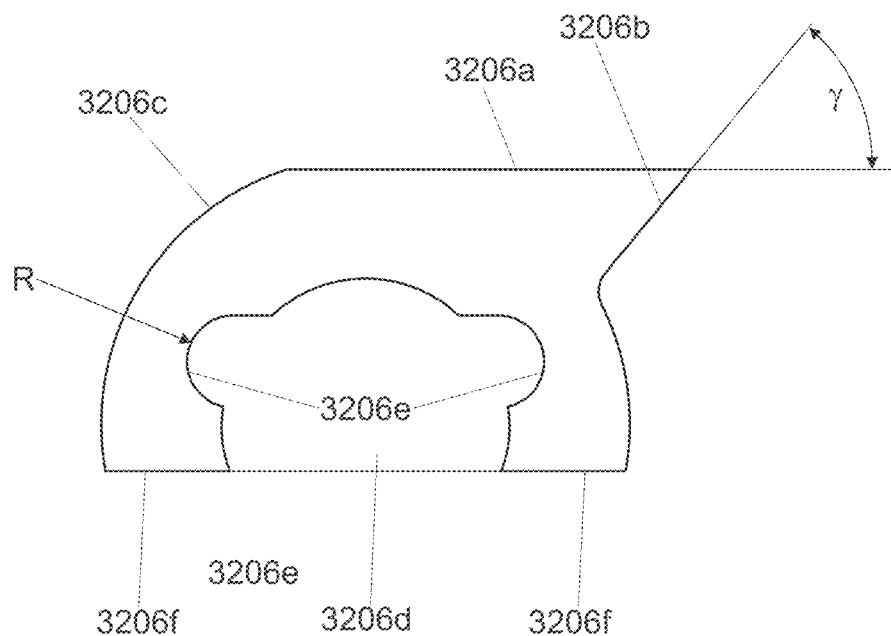
FIG. 48A-B different views of the cutting blade of the embodiment shown in FIG. 43.
Figure 48B:
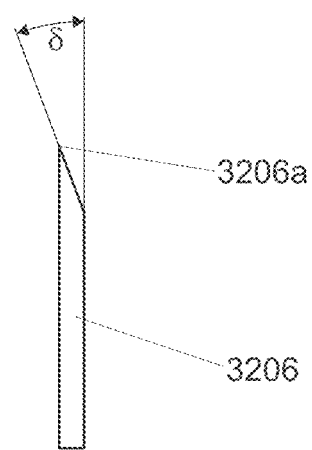

FIG. 48A-B show different views of the metal cutting blade of the embodiment shown in FIG. 43.

As shown, the cutting blade 3206 comprises a cutting edge 3206*a*, wherein the cutting edge 3206*a* has an acute end 3206*b* and a rounded end 3206*c*. The cutting edge 3206*a* of the cutting blade 3206 can have an angle γ chosen in the range of 15°-25°, especially approx. 19°-21°, here of 20°. A deviation of ±1° is not problematic and will be tolerated in this embodiment.

The acute end 3206*b* of the cutting blade 3206 can have an angle δ chosen in the range of 45°-55°, especially approx. 47°-53°, here of approx. 50°.

The rounded end 3206*c* of the cutting blade 3206 has the same radius R as the outer edge of the cutting blade 3206 on the side of the rounded end 3206*c*.

For form-fit attachment to the plunger 3203, there is a holder opening 3206*d*, having fixation recesses 3206*e*.

For easier manufacturing, there is a break line 3206*f*.

On this break line, the two blades could be jointly manufactured and then are broken into separate blades. Alternatively, also a manufacturing portion or a carrier could be there during manufacturing, which allows easier handling.

FIG. 49A-B are different views of the metal torsion spring 3204 of the embodiment shown in FIG. 43.

The torsion spring 3204 is shown it the loaded position C1 and the unloaded position C3.

The following aspects are in the following explicitly disclosed in connection with the present invention as described above:

Aspect 1: A sample collection device (200) for collecting a sample (500) of a fluid of a user, e.g. blood, the sample collection device (200) comprising:
    a sample container (212) arranged to receive said sample (500) and comprising an open end (2121);
    a triggering mechanism (209, 210, 209', 210', 211);
    a cap (202) arranged to cooperate with said sample container (212) so as to close said open end (2121), said cap (202) being arranged to be moved in and/or on the sample container (212) from a first cap position to a second cap position, wherein in the first and in the second cap positions said cap (202) is at least partially in contact with said sample container (212) so as to guide the movement of the cap (202) from the first cap position to the second cap position, said cap (202) comprising:
- a collection window (205) arranged to enter in contact with an area of the user to be incised;
- an incision mechanism (203, 204, 206) movable in the cap (202) by said triggering mechanism (209, 210, 209', 210', 211) from a first incision mechanism position to a second incision mechanism position, wherein during said moving the incision mechanism (203, 204, 206) is arranged to incise at the collection window (205) the area of the user so as to exit the sample (500) from the user, said sample being received by said sample container (212), and wherein during the moving from the first incision mechanism position to the second incision mechanism the cap (202) is in the first cap position;
- a sealing mechanism, so as to seal said sample container (212) when the cap (202) is in the second cap position, so as to safely transport said sample (500).

Aspect 2: The sample collection device (200) of aspect 1, wherein said cap (202) comprises a first cap portion (2021) and a second cap portion (2022), wherein the first cap portion (2021) comprises the collection window (205) arranged to enter into contact with the user.

Aspect 3: The sample collection device (200) of aspect 2, wherein said cap (202) comprises an opening (215), the collection window (205) comprising a part of said opening (215).

Aspect 4: The sample collection device (200) of one of aspects 2 or 3, wherein at least a part (2021') of said first cap portion (2021) is inserted into the sample container (212).

Aspect 5: The sample collection device (200) of one of aspects 2 to 4, wherein the second cup portion (2022) comprises a cavity (216) for receiving the incision mechanism (203, 204, 206) once it is in said second incision mechanism position, the incision mechanism (203, 204, 206) is irreversibly and safely retracted in this cavity (216) so that it can no longer incise the user.

Aspect 6: The sample collection device (200) of one of aspects 1 to 5, said incision mechanism (203, 204, 206) comprising: —a support element (203), e.g. a piston, comprising a cutting element (206), e.g. a blade or blade-like element; —an elastic element (204), e.g. a spring, being blocked in a compressed position, said elastic element (204), once the incision mechanism is triggered, being free to be decompressed, said decompression moving the support element (203) and then the cutting element (206) from the first incision mechanism position to the second incision mechanism position.

Aspect 7: The sample collection device (200) of aspect 6, wherein when in the first incision mechanism position, the cutting element (206) is in the sample container (212), so as to ensure the safety of the user and/or of an operator.

Aspect 8: The sample collection device (200) of one of aspects 1 to 7, wherein the movement of the incision mechanism (203, 204, 206) from the first incision mechanism position to the second incision mechanism position is a linear movement performed in a direction parallel to the area of the user to be incised.

Aspect 9: The sample collection device (200) of one of aspects 1 to 7, wherein the movement of the incision mechanism (203, 204, 206) from the first incision mechanism position to the second incision mechanism position is a circular movement, wherein the axis of rotation of this circular movement is preferably a main axis of the sample container (212).

Aspect 10: The sample collection device (200) of one of aspects 1 to 9, wherein the support element comprises a protrusion (230) cooperating with a finger (232) of the cap (202) so that the movement of the incision mechanism (203, 204, 206) from the first incision mechanism position to the second incision mechanism position is toward the user's skin while the incision mechanism (203, 204, 206) cuts the skin.

Aspect 11: The sample collection device (200) of one of aspects 1 to 10, wherein the movement of the cap (202) from the first cap position to the second cap position is a linear movement, the cap sliding onto the sample container (212) during said linear movement.

Aspect 12: The sample collection device (200) of one of aspects 1 to 10, wherein the movement of the cap (202) from the first cap position to the second cap position is a circular movement.

Aspect 13: The sample collection device (200) of one of aspects 1 to 12, comprising a suction pack (201) arranged to receive the sample container (212) and the cap (202), and to be sterilized, the suction pack (201) comprising a membrane (208) allowing the vacuum to enter in the suction pack (201).

Aspect 14: The sample collection device (200) of aspect 13, the suction pack (201) comprising a removable lid (207), in particular a non-permeable removable lid (207), so as to guarantee a barrier from moisture and ensure sterilization of its content.

Aspect 15: The sample collection device (200) of one of aspects 13 or 14, the suction pack (201) being at least partially transparent.

Aspect 16: The sample collection device (200) of one of aspects 13 to 15, comprising lubricant materials inside the suction pack (201) and/or on the suction pack (201) so as to enhance the sealing between the suction pack (201) and the user.

Aspect 17: The sample collection device (200) of one of aspects 6 to 16, said triggering mechanism (209, 210, 209', 210', 211) comprises a triggering element (209) arranged to be moved from a first triggering element position, wherein it holds the elastic element (204) in a blocked position, e.g. in a compressed position, and the support element (203) in a fixed position, to a second triggering element position wherein the triggering element (209) no longer holds the elastic element (204) nor the support element (203).

Aspect 18: The sample collection device (200) of aspects 17, the cap (202) comprising the triggering element (209), which for example is a half-ring surrounding at least a part of the support element (203), or a tab (209') in the cap (202).

Aspect 19: The sample collection device (200) of one of aspects 17 to 18, the triggering element comprising a protrusion (211), e.g. a finger, the support element comprising a cavity (210) arranged to receive said protrusion (211) so as to hold the triggering element (209) in the first triggering element position.

Aspect 20: The sample collection device (200) of one of aspects 1 to 19, said cap (202) being a standard cap arranged to be automatically opened by a blood analysis apparatus.

Aspect 21: The sample collection device (200) of the previous aspect, the diameter of the second portion (2022) of the standard cap being 15 mm.

Aspect 22: The sample collection device (200) of one of aspects 1 to 21, said sample container (212) being a tube, in particular a standard tube being arranged to be entered in a blood analysis apparatus.

Aspect 23: The sample collection device (200) of the previous aspect, a diameter (d1) of the standard tube being comprised in the range 12 mm to 16 mm, e.g. 13 mm.

Aspect 24: The sample collection device (200) of one of aspects 1 to 23, said sample container (212) being arranged for receiving at least 0.5 ml, and preferably 1 ml, of fluid sample (500).

Aspect 25: The sample collection device (200) of one of aspects 1 to 24, said sample container (212) being at least partially transparent.

Aspect 26: The sample collection device (200) of one of aspects 1 to 25, said sample collection device (100) being consumable.

Aspect 27: The sample collection device (200) of one of aspects 1 to 26, the sample container (212) comprising one or several biomarker pads (214) reacting with the fluid sample, allowing a direct analysis of the fluid sample.

Aspect 28: The sample collection device (200) of one of aspects 1 to 27, said cap (202) comprising said triggering mechanism (209, 210, 209', 210', 211), in particular wherein said triggering mechanism comprises at least one deformable element (2020).

Aspect 29: The sample collection device (200) of one of aspects 1 to 28, said cap (202), the suction pack (201) being a first suction pack (201), the sample collection device (200) comprising a second suction pack (110), wherein the first suction pack (201) comprises a cavity (2010) arranged to receive the sample container (212) and the cap (202), and having a first thickness, wherein the second suction pack (110) comprises a cavity (1100), having a second thickness, which is greater than the first thickness, wherein the first suction pack (201) is arranged to be received by the second suction pack (110), so that the difference between the two thicknesses creates a chamber arranged to be placed under vacuum in the manufacturing assembly line or in a healthcare facility.

Aspect 30: The sample collection device (200) of aspect 29, wherein, the second suction pack (110) comprises a bistable element, wherein the first suction pack (201) comprises a piercing protrusion (2014), wherein once a user activates the bistable element (2012), the piercing protrusion (2014) pierces a membrane (208) on the first suction pack (201), thereby transferring the vacuum in the collection chamber.

Aspect 31: The sample collection device (200) of one of aspects 28 or 29, wherein the second suction pack (110) comprises also one or more holes (2010), completely covered by a removable cap (140).

Aspect 32: The sample collection device (200) of one of aspects 1 to 31, wherein the part of the suction pack (201) arranged to be placed in contact with a user has a curvature (2013) to fit the shape and/or the curvature of the user, so as to ensure a better seal between the user and the suction pack (201).

Aspect 33: A system (300) for extracting and collecting a sample (500) of a fluid of a user, comprising:
the sample collection device (200) according to one of the aspects 1 to 32;
a sample extraction device (100), comprising:
a port (107) arranged to receive at least a part of said sample collection device (200);
a vacuum chamber (101);
a vacuum creation mechanism (108) arranged to create vacuum in the vacuum chamber (101);
a valve (104) arranged to close and/or open the vacuum chamber (101), and/or to release the sample collection device (200) to atmospheric pressure;
a valve control mechanism (102) arranged to command the valve (104) so as to release the vacuum from the vacuum chamber (101) to the sample collection device (200), and/or to release the sample collection device (200) to atmospheric pressure.

Aspect 34: The system (300) of the aspect 33, wherein the sample extraction device 100 comprises first connection means (120), the sample collection device 200 comprises second connection means (220) so as to perform a mechanical connection between the sample extraction device (100) and the sample collection device (200).

Aspect 35: The system (300) of one of the aspects 33 or 34, wherein the sample extraction device (100) comprises an electronic module (105) comprising a communication module and a power supply.

Aspect 36: The system (300) of one of the aspects 33 to 35, wherein the sample extraction device (100) comprises at least a sensor (106), e.g. an optic sensor, for detecting a predetermined sample volume in the sample container (212).

Aspect 37: The system (300) of one of the aspects 33 to 36, wherein the sample extraction device (100) comprises an alerting mechanism, indicating to the user the end of the sample extraction, e.g. by an audio and/or visible signal.

Aspect 38: The system (300) of one of the aspects 33 to 37, wherein extraction device comprising a gasket (103) cooperating with the area of the sample collection device (200) comprising the membrane (208).

Aspect 39: The system (300) of one of the aspects 33 to 38, wherein the sample collection device (200) and the sample extraction device (100) are arranged so that, when connected, the valve (104) of the sample extraction device (100) is placed in correspondence with the membrane (208) of the sample collection device (200) and/or the sensor(s) (106) of the sample extraction device (100) is(are) placed in correspondence with the sample container (212) of the sample extraction device (100).

Aspect 40: The system (300) of one of the aspects 33 to 39, wherein the sample extraction device (100) is consumable.

Aspect 41: The system (300) of aspect 40, wherein the sample collection device (200) and the sample extraction device (100) form a single consumable system (300).

Aspect 42: A method for extracting and collecting a sample (500) of a fluid of a user by using the system (300) according to aspects 33 to 40, comprising the following steps:
placing the system (300) on an area of the user (400) kept substantially vertical so that the angle ($\theta$) formed by the direction (a) of the main axis of the system (300) and the direction (z) of the force of gravity (g) is comprised in the range 0°-45°;
actuating the valve control mechanism (102), so as to open the valve (104) so as to transfer the vacuum from the vacuum chamber (101) of the sample extraction device (100) to the suction pack (201) of the sample collection device (200) through an opening (218) in the suction pack (202), said opening (218) being covered by a membrane (208) located in the suction pack (202);
stretching and/or deforming a user's part to be cut (401) by the vacuum in the suction pack (201);

actuating by the stretched and/or deformed user's part to be cut (401) the triggering mechanism (209, 210, 209', 210', 211) which in turn triggers the incision mechanism (203, 204, 206);

moving the incision mechanism (203, 204, 206) from a first incision mechanism position in the cap (202) to a second incision mechanism position in the cap (202) so that, as the support element (203) of the incision mechanism is connected to the cutting element (206), the cutting element (206) will section the stretched and deformed user's part to be cut (401); collecting a volume of fluid sample in the sample container (212); moving the cap (202) onto the sample container (212) from the first cap position to the second cap position to seal the sample container (212).

Aspect 43: The method of aspect 42, further comprising:

after the skin incision, retracting the cutting element (206) into the cap (202), with no risk of injury or contamination to anyone handling the sample collection device (200).

Aspect 44: The method of one of aspects 42 or 43, further comprising:

placing a cap (202) in and/or on the sample container (212), said cap (202) being at least partially in contact with said sample container (212);

packaging the sample container (212) and the cap (202) in the suction pack (202); closing the suction pack (202) by a lid (207);

sterilizing the closed suction pack (202); placing the sterilized suction pack (202) on or in the sample extraction device (100).

Aspect 45: The method of one of aspects 42 to 44, further comprising:

mechanically connecting the sterilized suction pack (202) to the sample extraction device (100);

removing the lid (207) of the suction pack (201);

activating a vacuum creation mechanism (108) of the sample extraction device (100) so as to load vacuum into the vacuum chamber (101).

Aspect 46: The method of one of aspects 42 to 45, further comprising:

once the fluid sample volume has reached a pre-determined value, indicating to the user the end of fluid sampling;

pressing the valve control mechanism (102) to put back the system (300), and in particular the suction pack (201), at atmospheric pressure.

Aspect 47: The method of one of aspects 42 to 46, further comprising:

removing the system (300) from the skin of the user (400);

removing the sealed sample container (212) from the suction pack (201);

removing the suction pack (201) from the sample extraction device (100).

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A sample collection device for collecting a blood sample of a patient, the sample collection device at least comprising:
   a first partially deformable shell, the first shell being an exterior, surface shell, and
   a second at least partially pierceable shell, the second shell enclosed by the first shell,
   a sample container, and
   an automatic mechanical cutting mechanism comprising a rotatable cutting blade and an actuator torsion spring,
   wherein in a mounted state of the collection device a pre-packaged vacuum is sealed between the first shell and the second shell,
   wherein the second shell encloses in the mounted state the sample container and the automatic mechanical cutting mechanism comprising the rotatable cutting blade and the actuator torsion spring, the actuator torsion spring being actuatable by pressing the first shell, thereby releasing and rotating the cutting blade in order to create an incision, and
   wherein by pressing the first shell the pre-packaged vacuum is released to a collection opening of the second shell such that the vacuum effects a suction effect in order to cause blood coming out of the incision created by the rotatable cutting blade to leak into the sample container.

2. The sample collection device according to claim 1, wherein the cutting blade is mounted on and/or part of a rotatable radial plunger.

3. The sample collection device according to claim 2, wherein the plunger further comprises a seal portion, the seal portion being an O-Ring on an outside of the plunger, and wherein the seal portion being arranged and configured such that after collecting the blood sample the sample container can be sealed by the seal portion such that the sample container is closed by the plunger and the seal portion.

4. The sample collection device according to claim 3, wherein the plunger further comprises a pierceable septum.

5. The sample collection device according to claim 4, wherein the plunger allows an access to the septum.

6. The sample collection device according to claim 2, wherein the sample container is a cylindrical tube with a closed and an open end, the open end being oriented to the plunger, the closed end having a spherical shape.

7. The sample collection device according to claim 1, wherein the cutting blade comprises a cutting edge, wherein the cutting edge has an acute end, a first rounded end, and a second rounded end.

8. The sample collection device according to claim 7, wherein the cutting edge of the cutting blade has an angle $\gamma$ between 15°-25°.

9. The sample collection device according to claim 8, wherein the acute end of the cutting blade has an angle $\delta$ between 45°-55°.

10. The sample collection device according to claim 8, wherein the angle $\gamma$ is between 19°-21°.

11. The sample collection device according to claim 8, wherein the angle $\gamma$ is 20°.

12. The sample collection device according to claim 9, wherein the angle $\delta$ is between 47°-53°.

13. The sample collection device according to claim 9, wherein the angle $\delta$ is 50°.

14. The sample collection device according to claim 7, wherein the first rounded end of the cutting blade has a same radius R as the second rounded end of the cutting blade.

15. The sample collection device according to claim 1, wherein a button on the first shell is configured to actuate the actuator torsion spring.

16. The sample collection device according to claim 1, wherein the second at least partially pierceable shell is pierceable through a membrane.

17. The sample collection device according to claim 16, further comprising a vacuum unlocking element, the vacuum unlocking element being a bendable arm carrying a piercing portion to pierce the membrane.

18. The sample collection device according to claim 1, wherein the second at least partially pierceable shell comprises a plurality of stabilization ribs.

19. The sample collection device according to claim 18, wherein at least one of the plurality of stabilization ribs encircles a recess within the second at least partially pierceable shell.

20. The sample collection device according to claim 18, wherein the plurality of stabilization ribs are attached to a base plate.

\* \* \* \* \*